US010999767B2

(12) United States Patent
Abuan et al.

(10) Patent No.: US 10,999,767 B2
(45) Date of Patent: May 4, 2021

(54) MULTI-DEVICE COMMUNICATION MANAGEMENT

(71) Applicant: Apple Inc., Cupertino, CA (US)

(72) Inventors: Joe S. Abuan, Cupertino, CA (US); Ian J. Baird, San Jose, CA (US); Xiaosong Zhou, Campbell, CA (US); Christopher M. Garrido, San Jose, CA (US); Dazhong Zhang, Saratoga, CA (US); Keith W. Rauenbuehler, San Francisco, CA (US); Yan Yang, San Jose, CA (US); Patrick Miauton, Redwood City, CA (US); Eric L. Chien, Santa Clara, CA (US); Berkat S. Tung, San Jose, CA (US); Karthick Santhanam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 16/145,078

(22) Filed: Sep. 27, 2018

(65) Prior Publication Data
US 2019/0104446 A1    Apr. 4, 2019

Related U.S. Application Data

(60) Provisional application No. 62/565,910, filed on Sep. 29, 2017.

(51) Int. Cl.
*H04W 36/00*    (2009.01)
*H04L 29/08*    (2006.01)
(Continued)

(52) U.S. Cl.
CPC ...... *H04W 36/0033* (2013.01); *G06F 9/4856* (2013.01); *H04L 9/0819* (2013.01);
(Continued)

(58) Field of Classification Search
CPC ............... H04W 36/0033; H04W 4/08; H04W 12/04033; H04W 12/06; H04W 36/0009;
(Continued)

(56) References Cited

U.S. PATENT DOCUMENTS 9,560,185 B2 *    1/2017  Nelson .............. H04M 1/72563
10,506,483 B1 *  12/2019  Williamson ....... H04B 7/18521
(Continued)

FOREIGN PATENT DOCUMENTS

| EP | 2739112 | 6/2014 |
|---|---|---|
| EP | 3021604 | 5/2016 |
| WO | WO 2007/009108 | 1/2007 |

OTHER PUBLICATIONS

International Search Report and Written Opinion from PCT/US2018/049421, dated Nov. 22, 2018, 13 pages.

*Primary Examiner* — Walter J Divito
(74) *Attorney, Agent, or Firm* — Morgan, Lewis & Bockius LLP

(57) ABSTRACT

A device implementing the subject technology may include at least one processor configured to receive an indication of a task being performed at an other device. The at least one processor is further configured to perform, in response to receipt of the indication, one or more preliminary operations in anticipation of receiving a handoff of the task. The at least one processor is further configured to receive, after performing the one or more preliminary operations, a notification that the task is being handed off. The at least one processor is further configured to receive the handoff of the task from the other device. The at least one processor is further configured to continue to perform the task based at least in part on the one or more preliminary operations that were performed prior to receiving the notification that the task is being handed off.

20 Claims, 31 Drawing Sheets

(51) Int. Cl.
| | |
|---|---|
| *H04W 4/08* | (2009.01) |
| *H04L 29/06* | (2006.01) |
| *H04W 12/04* | (2021.01) |
| *H04W 12/06* | (2021.01) |
| *G06F 9/48* | (2006.01) |
| *H04W 36/02* | (2009.01) |
| *H04L 12/18* | (2006.01) |
| *H04L 9/08* | (2006.01) |
| *H04B 17/318* | (2015.01) |
| *H04B 17/336* | (2015.01) |

(52) U.S. Cl.
CPC .......... *H04L 12/185* (2013.01); *H04L 12/189* (2013.01); *H04L 12/1822* (2013.01); *H04L 12/1827* (2013.01); *H04L 63/065* (2013.01); *H04L 65/403* (2013.01); *H04L 67/14* (2013.01); *H04L 67/141* (2013.01); *H04L 67/143* (2013.01); *H04W 4/08* (2013.01); *H04W 12/04033* (2019.01); *H04W 12/06* (2013.01); *H04W 36/0009* (2018.08); *H04W 36/0016* (2013.01); *H04W 36/0022* (2013.01); *H04W 36/0027* (2013.01); *H04W 36/0058* (2018.08); *H04W 36/02* (2013.01); *H04B 17/318* (2015.01); *H04B 17/336* (2015.01)

(58) Field of Classification Search
CPC ......... H04W 36/0016; H04W 36/0022; H04W 36/0027; H04W 36/02; H04W 36/0058; H04L 67/143; H04L 63/065; H04L 67/141; H04L 65/403; H04L 12/1822; H04L 12/1827; H04L 12/185; H04L 12/189; H04L 9/0819; H04L 67/14; G06F 9/4856; H04B 17/318; H04B 17/336
See application file for complete search history.

(56) References Cited

U.S. PATENT DOCUMENTS

| | | |
|---|---|---|
| 2003/0086390 A1 | 5/2003 | Eschbach |
| 2008/0081628 A1 | 4/2008 | Ye |
| 2012/0077536 A1 | 3/2012 | Goel |
| 2013/0077674 A1 | 3/2013 | Kim |
| 2014/0072000 A1 | 3/2014 | Shiva |
| 2014/0317302 A1 | 10/2014 | Naik |
| 2015/0172333 A1 | 6/2015 | Lindstrom |
| 2015/0358406 A1 | 12/2015 | Scheer |
| 2016/0219435 A1 | 7/2016 | Mistry et al. |
| 2017/0127298 A1 | 5/2017 | Ryu |
| 2017/0181048 A1* | 6/2017 | Shah ................... H04L 65/1016 |
| 2020/0029353 A1 | 1/2020 | Xu |

* cited by examiner

MULTI-DEVICE COMMUNICATION MANAGEMENT

CROSS-REFERENCE TO RELATED APPLICATIONS

The present application claims the benefit of U.S. Provisional Patent Application Ser. No. 62/565,910, entitled "Multi-Device Communication Management," filed on Sep. 29, 2017, which is hereby incorporated by reference in its entirety for all purposes.

TECHNICAL FIELD

The present description relates generally to communication management between multiple devices, including management of a group communication session between multiple devices.

BACKGROUND

Communication between multiple devices (e.g., multi-device communication) has been utilized more frequently over time. For example, multiple users may use their respective devices to participate in a group communication session to communicate with one another. With advancement of technologies, a range of tasks that may be performed by multiple devices communicating with each other has expanded over time. For example, multi-device communication may enable users to perform various tasks such as participating in an audio/video conference, sharing files, streaming media to another device, etc.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

With the advancement of device and communication technologies, group communication sessions may frequently include more than two devices. For example, an audio/video conference among a large number of people using their respective devices has become possible. However, communication between more than two devices may face challenges with respect to providing an optimal user experience to the user of each device. For example, poor communication conditions at one device may cause a delay and/or a suboptimal user experience at one or more of the other devices. Furthermore, when one user experiences more audio delay during an audio/video conference than one or more of the other users, it may be difficult for the user to participate in the audio/video conference. For example, by the time the user who experiences more audio delay hears a communication, another user (who received the communication with less delay) may have already started responding, and therefore the user who experiences more audio delay may not be able to effectively participate in the audio/video conference.

The subject system for multi-device communication management provides solutions to these and other problems by jointly managing/coordinating multiple different devices in a group communication session, while allowing a text based group communication session to be switched to an audio/video group communication session with minimal latency. For example, the subject system jointly coordinates the quality of the audio and/or video streams provided by the devices in the group communication session such that each device can access high quality audio and/or video streams from other devices while ensuring that any devices with bandwidth constraints have access to lower quality streams. Furthermore, the subject system jointly controls the audio delay experienced by the users in the group communication session such that no single user experiences significantly more audio delay than any other user. In addition, the subject system allows users to transition between devices during a group communication session, such that the users can seamlessly participate in the group communication session while switching between different devices.

Figure 1:
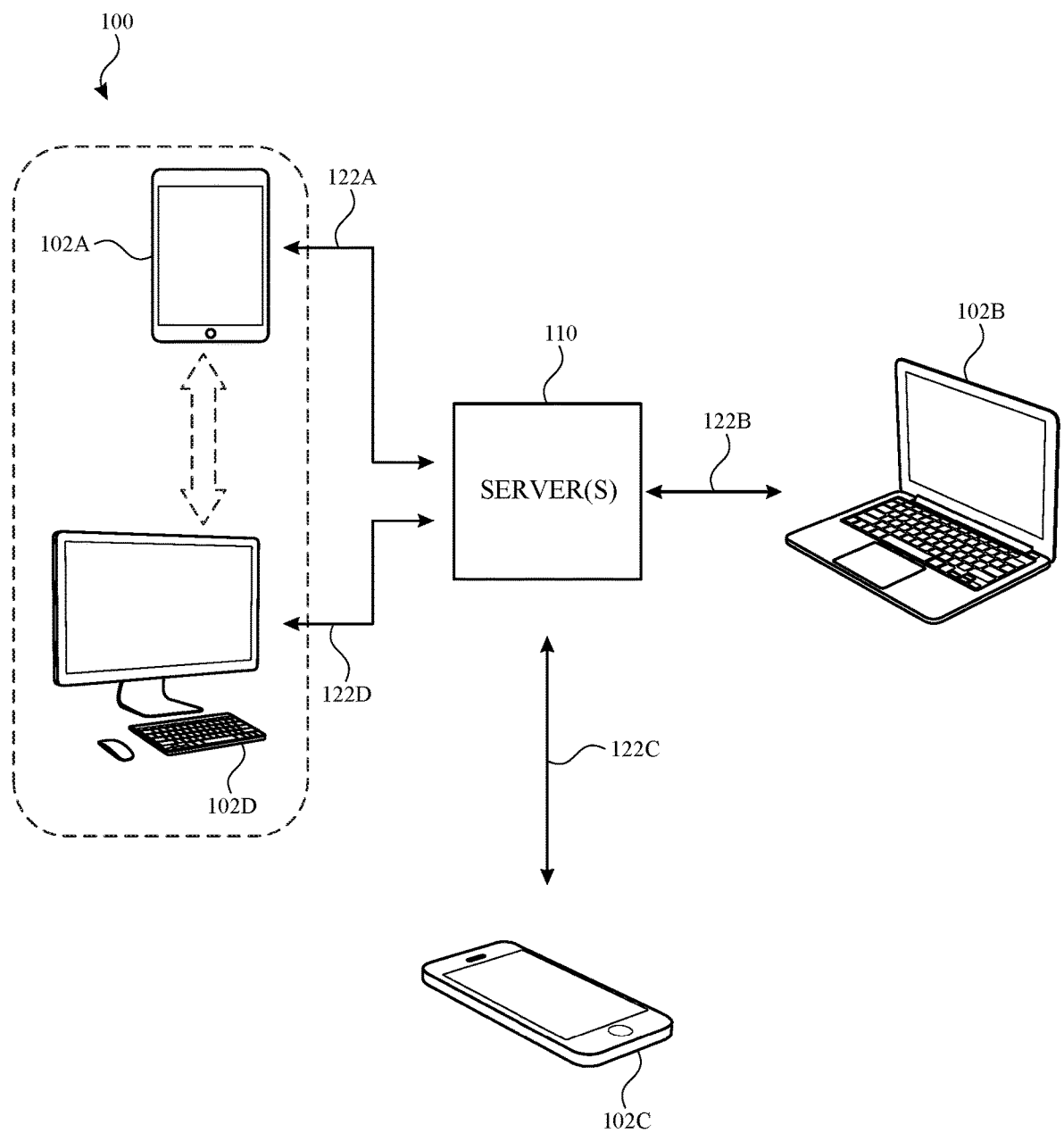
FIG. 1 illustrates an example network environment in which a multi-device communication management system may be implemented in accordance with one or more implementations.

FIG. 1 illustrates an example network environment 100 in which a multi-device communication management system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-D and one or more servers 110, such as a cloud of servers, which for explanatory purposes may be collectively referred to as a server 110. The electronic devices 102A-D may be communicatively coupled to the server 110 by the communication links 122A-D, respectively. In one or more implementations, one or more of the communication links 122A-D may include, and/or may be communicatively coupled to, one or more wired or wireless network components, such as routers, switches, access points, base stations, and the like. In one or more implementations, the electronic devices 102A-D may communicate with each other directly and/or via the server 110, such as in a group communication session.

The electronic devices 102A-D may be, for example, portable computing devices such as laptop/desktop computers, smartphones, tablet devices, wearable devices (e.g., watches, bands, etc.), or other appropriate devices that include one or more wired or wireless interfaces, such as one or more near field communication (NFC) radios, WLAN radios, Bluetooth radios, Zigbee radios, cellular radios, and/or other wireless radios. In FIG. 1, by way of example, the electronic device 102A is depicted as a tablet device, the electronic device 102B is depicted as a laptop device, the electronic device 102C is depicted as a mobile device, and the electronic device 102D is depicted as a desktop computer. One or more of the electronic devices 102A-D may be, and/or may include all or part of, the electronic device discussed below with respect to FIG. 2 and/or the electronic system discussed below with respect to FIG. 31. The server 110 may be, and/or may include all or part of, the server discussed below with respect to FIGS. 3 and 4 and/or the electronic system discussed below with respect to FIG. 31.

In one or more implementations, the electronic device 102A and the electronic device 102D may be registered to a same user account, such as through the server 110. Thus, a user associated with the user account may receive communications, e.g., messages, phone calls, notifications, etc., via one or both of the electronic devices 102A,D. In one or more implementations, the electronic devices 102A,D may also be connected via a local peer-to-peer connection, such as BTLE, when the electronic devices 102A,D are located proximal to one another, such as within the BTLE transmission range. The user may also use one or more of the electronic devices 102A,D, such as the electronic device 102A, in a group communication session with one or more other devices, such as the electronic devices 102B-C, which may each be associated with a different user account. In a group communication session, audio and/or video captured at the electronic device 102A may be transmitted to the other electronic devices 102B-C, e.g., via the server 110. Similarly, the electronic device 102A may receive audio and/or video streams corresponding to the other electronic devices 102B-C via the server 110.

In the subject system, the server 110 may facilitate securely forming a group communication session between one or more of the electronic devices 102A-D, such as an audio/video conference, and/or securely transitioning between different communication modalities (e.g., messaging, audio, or video) for a given group communication session. For example, the users of one or more of the electronic devices 102A-D may be participating in a group messaging exchange and may decide that they would like to transition from the group messaging exchange to an audio/video conference. The server 110 may facilitate transitioning the group communication session from the group messaging exchange to the audio/video conference. An example process for transitioning between different communication modalities for a given group communication session is discussed further below with respect to FIG. 30. In one or more implementations, the server 110 may also facilitate securely adding one or more of the electronic devices 102A-D to an existing group communication session. Example processes of a server 110 securely forming a group communication session and/or securely adding one or more of the electronic devices 102A-D to an existing group communication session are discussed further below with respect to FIGS. 6-13 and 19-27.

In the group communication session, such as an audio/video conference, the electronic devices 102A-D may provide independent audio and/or video streams to each other. However, since the uplink/downlink bandwidth/network conditions of the communication links 122A-D of the electronic devices 102A-D may differ, the electronic devices 102A-D and/or the server 110 may coordinate the quality of the audio and/or video streams provided and/or made available by the electronic devices 102A-C for the group communication session to ensure that sufficiently low bit rate streams are available for one or more of the electronic devices 102A-C that have a communication link that can only support low bit rate streams while still allowing others of the electronic devices 102A-C to receive high bit rate streams, e.g., when their respective communication links can support high bit rate streams. Example processes of the server 110 managing the quality of the audio/video streams provided and received by the electronic devices 102A-D in a group communication session are discussed further below with respect to FIGS. 16 and 29.

In one or more implementations, variations in network conditions of the communications links 122A-D may result in different amounts of jitter occurring at one or more of the electronic devices 102A-D. The different amounts of jitter may result in different jitter buffer levels and therefore different audio output delays across the electronic devices 102A-D. In the subject system, the server 110 may coordinate the audio output delay resulting from the jitter buffer level variations at the electronic devices 102A-D to ensure that the audio output delay is substantially uniform across the electronic devices 102A-D, while also ensuring that the jitter buffers of the electronic devices 102A-D do not experience buffer overruns or underruns. Example processes of the server 110 coordinating the audio output delay across the electronic devices 102A-D is discussed further below with respect to FIGS. 15 and 28.

The server 110 may also facilitate allowing a user to seamlessly switch electronic devices 102A,D while participating in a group communication session. For example, the user may initially use the electronic device 102A to participate in a group communication session (or otherwise perform a task), and may switch to the electronic device 102D (or another electronic device registered to the account of the user) to continue participating in the group communication session (or continue performing the task). Thus, when a user is participating in a group communication session (or performing another task) using the electronic device 102A, the server 110 may coordinate preparing, or warming up, one or more other electronic devices 102D registered to the account of the user, such that the group communication session (and/or other task) may be seamlessly and substantially instantly handed off to the one or more other electronic devices 102D, e.g., upon receiving a user request therefor. Example processes of the server 110 coordinating the preparation of electronic devices 102D for a seamless handoff of a group communication session (and/or other task) are discussed further below with respect to FIGS. 5, 17, and 18.

In one or more implementations, the subject system may allow a digital assistant to participate in, and/or assist, in a group communication session, such as an audio/video conference, a group messaging session, and the like. For example, a user of one of the electronic devices 102A-C may request, e.g. verbally, that the digital assistant schedule a reminder for the participants in the call to discuss the topic again next week, to schedule a lunch with the participants in the call, share/email a document, and/or any other task. The digital assistant, which may be implemented by the server 110 and/or by one or more of the electronic devices 102A-C, may then schedule the reminder, lunch, etc. for each of the user accounts associated with the electronic devices 102A-C participating in the group communication session.

When the digital assistant is implemented centrally, such as by the server 110, the server 110 may receive packets from the electronic devices 102A-C that correspond to digital assistant activities/requests initiated on the respective electronic devices 102A-C. The server 110 may process the digital assistant activities/requests and may broadcast resultant activities, such as scheduling a lunch, to each of the electronic devices 102A-C.

In one or more implementations, a digital assistant on each of the electronic devices 102A-C may be maintain a context and/or state associated with the group communication session during the group communication session. If, for example, the user of the electronic device 102A switches to the electronic device 102D during the group communication session, the context of the group communication session maintained by the digital assistant on the electronic device 102A may be handed off to the digital assistant on the electronic device 102D. In this manner, the interactions/history with the digital assistant on the electronic device 102A can be continued on the electronic device 102D.

In one or more implementations, the subject system may allow the server 110 to aggregate the video, audio, and or messaging communications for a given group communication session, and generate a summary of the group communication session, that may subsequently be provided to, and/or made available to, one or more of the electronic devices 102A-C and/or other electronic devices. The summary may be, for example, a video summary, a transcript, a podcast, or the like. The summary may include the entirety of the group communication session, and/or may be condensed, sped-up, or otherwise processed version of the group communication session.

Figure 2:
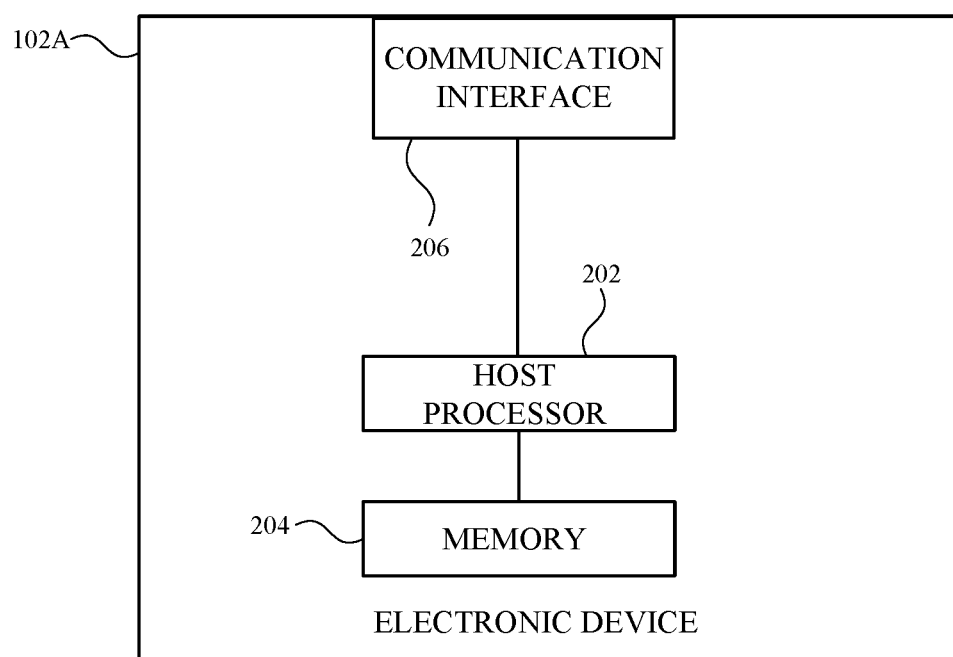
FIG. 2 illustrates an example electronic device that may implement a multi-device communication management system in accordance with one or more implementations.

FIG. 2 illustrates an example electronic device 102A that may implement the multi-device communication management system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include, among other components, a host processor 202, a memory 204, and a communication interface 206. The host processor 202, which may also be referred to as an application processor or a processor, may include suitable logic, circuitry, and/or code that enable processing data and/or controlling operations of the electronic device 102A. In this regard, the host processor 202 may be enabled to provide control signals to various other components of the electronic device 102A.

The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may be used by the host processor 202 to communicate via one or more communication protocols, such as Wi-Fi, cellular, Ethernet, Bluetooth, Zigbee, or NFC, or the like. In one or more implementations, the communication interface 206 may be, may include, and/or may be communicatively coupled to a first radio frequency (RF) circuit, such as a WLAN circuit, a cellular RF circuit, and/or a second RF circuit, such as a Bluetooth circuit and/or an NFC circuit, or the like.

In one or more implementations, one or more of the host processor 202, the memory 204, the communication interface 206, and/or one or more portions thereof, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
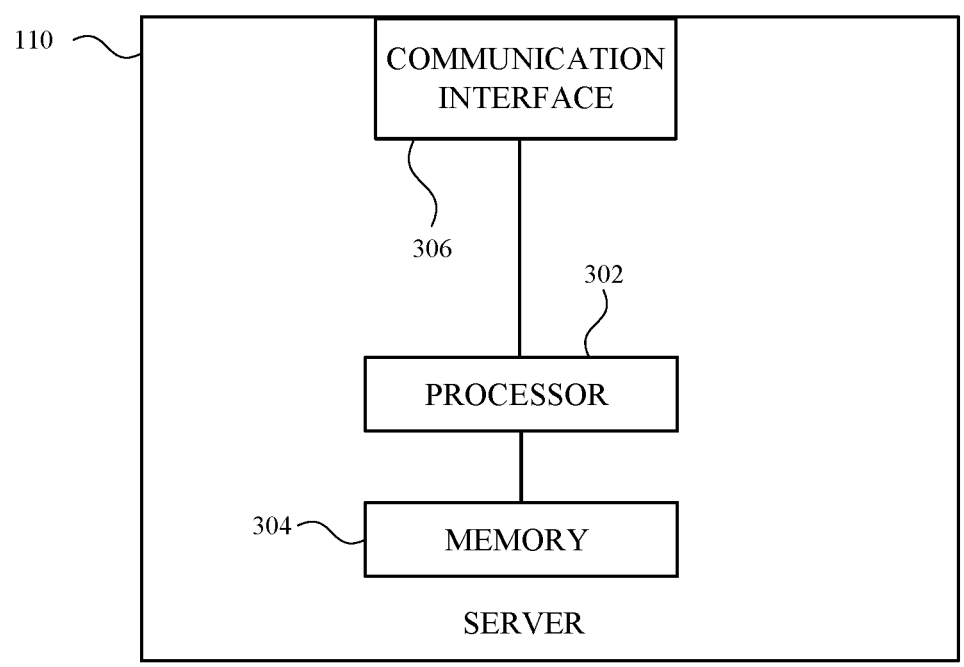
FIG. 3 illustrates an example server that may implement a multi-device communication management system in accordance with one or more implementations.

FIG. 3 illustrates an example server 110 that may implement the multi-device communication management system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The server 110 may include, among other components, a processor 302, a memory 304, and a communication interface 306. The processor 302 may include suitable logic, circuitry, and/or code that enable processing data and/or controlling operations of the server 110. In this regard, the processor 302 may be enabled to provide control signals to various other components of the server 110, and/or other servers/devices communicatively coupled thereto.

The processor 302 may also control transfers of data between various portions of the server 110. Additionally, the processor 302 may enable implementation of an operating system or otherwise execute code to manage operations, such as server-side operations, of the server 110. The memory 304 may include suitable logic, circuitry, and/or code that enable storage of various types of information such as received data, generated data, code, and/or configuration information. The memory 304 may include, for example, RAM, ROM, flash, and/or magnetic storage.

The communication interface 306 may be used by the processor 302 to communicate via a communication protocol, such as Wi-Fi, cellular, Ethernet, Bluetooth, Zigbee, or NFC, or the like. In one or more implementations, the communication interface 306 may be, may include, and/or may be communicatively coupled to a first radio frequency (RF) circuit, such as a WLAN circuit, a cellular RF circuit, and/or a second RF circuit, such as a Bluetooth circuit and/or an NFC circuit, or the like.

In one or more implementations, one or more of the processor 302, the memory 304, the communication interface 306, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 4:
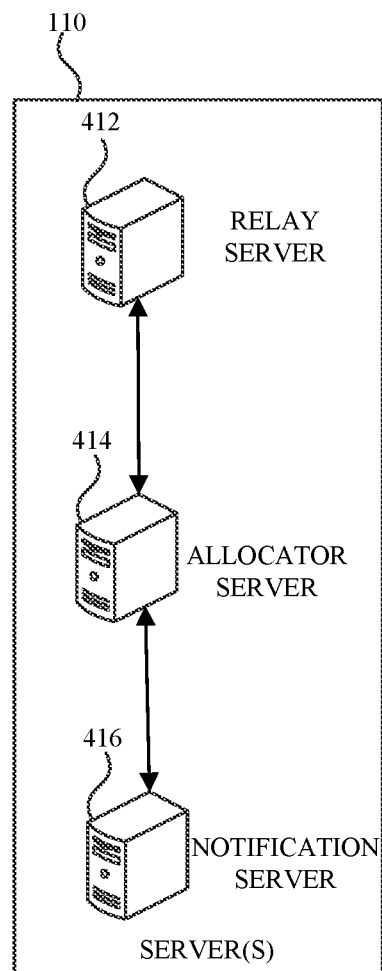
FIG. 4 illustrates an example server arranged in a distributed architecture that may implement a multi-device communication management system in accordance with one or more implementations.

FIG. 4 illustrates an example server 110 arranged in a distributed architecture that may implement a multi-device communication management system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The server 110 may include multiple servers 412, 414, 416 that may be communicatively coupled to one another. The multiple servers 412, 414, 416 may include a relay server 412, an allocator server 414, and a notification server 416. One or more of the servers 412, 414, 416 may be configured to communicate with one or more of the electronic devices 102A-D, such as to facilitate a group communication session. In one or more implementations, one or more of the servers 412, 414, 416 may not be communicatively coupled to one or more others of the servers 412, 414, 416.

Figure 5:
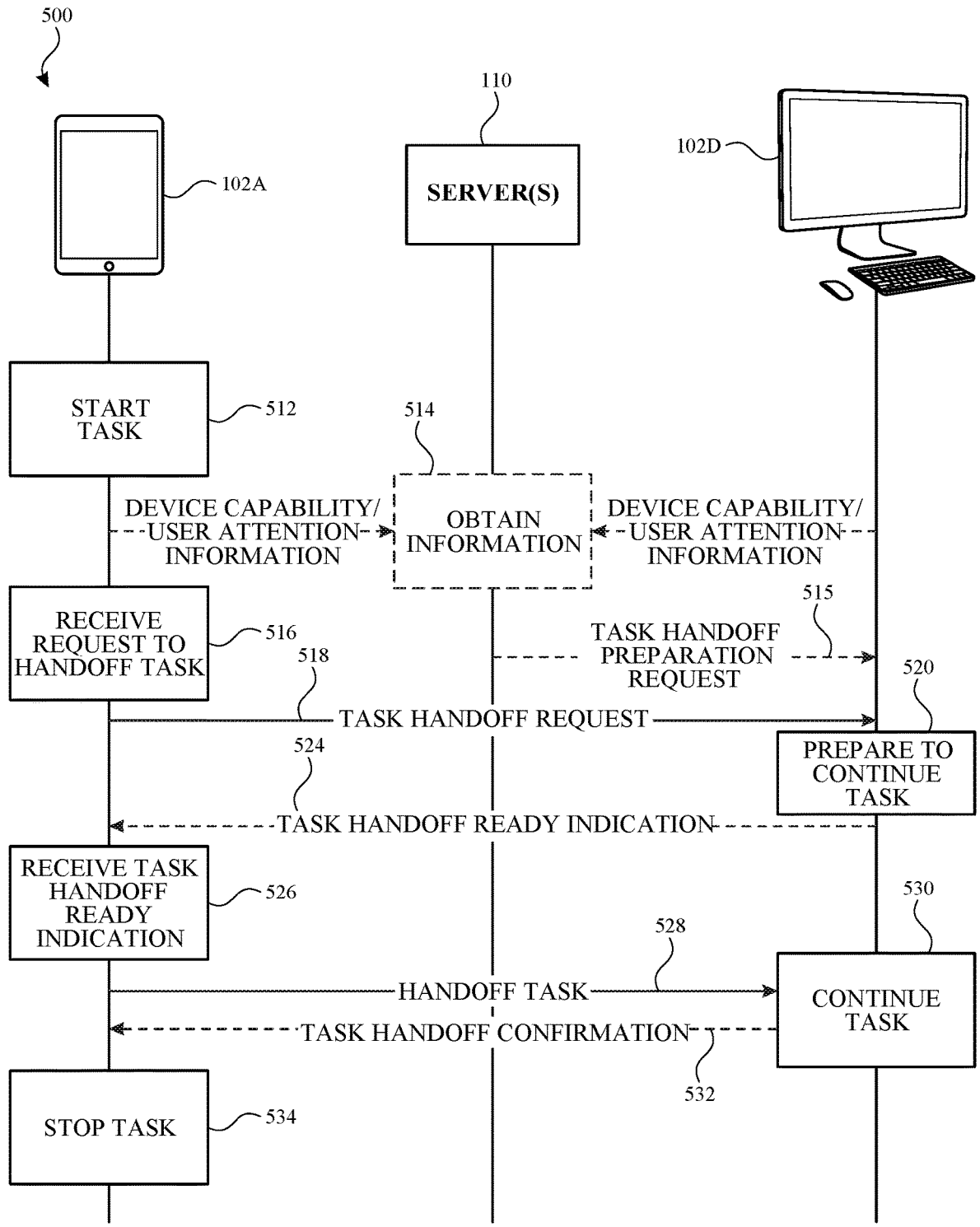
FIG. 5 illustrates a flow diagram of an example process of a multi-device communication management system in accordance with one or more implementations.
Figure 6:
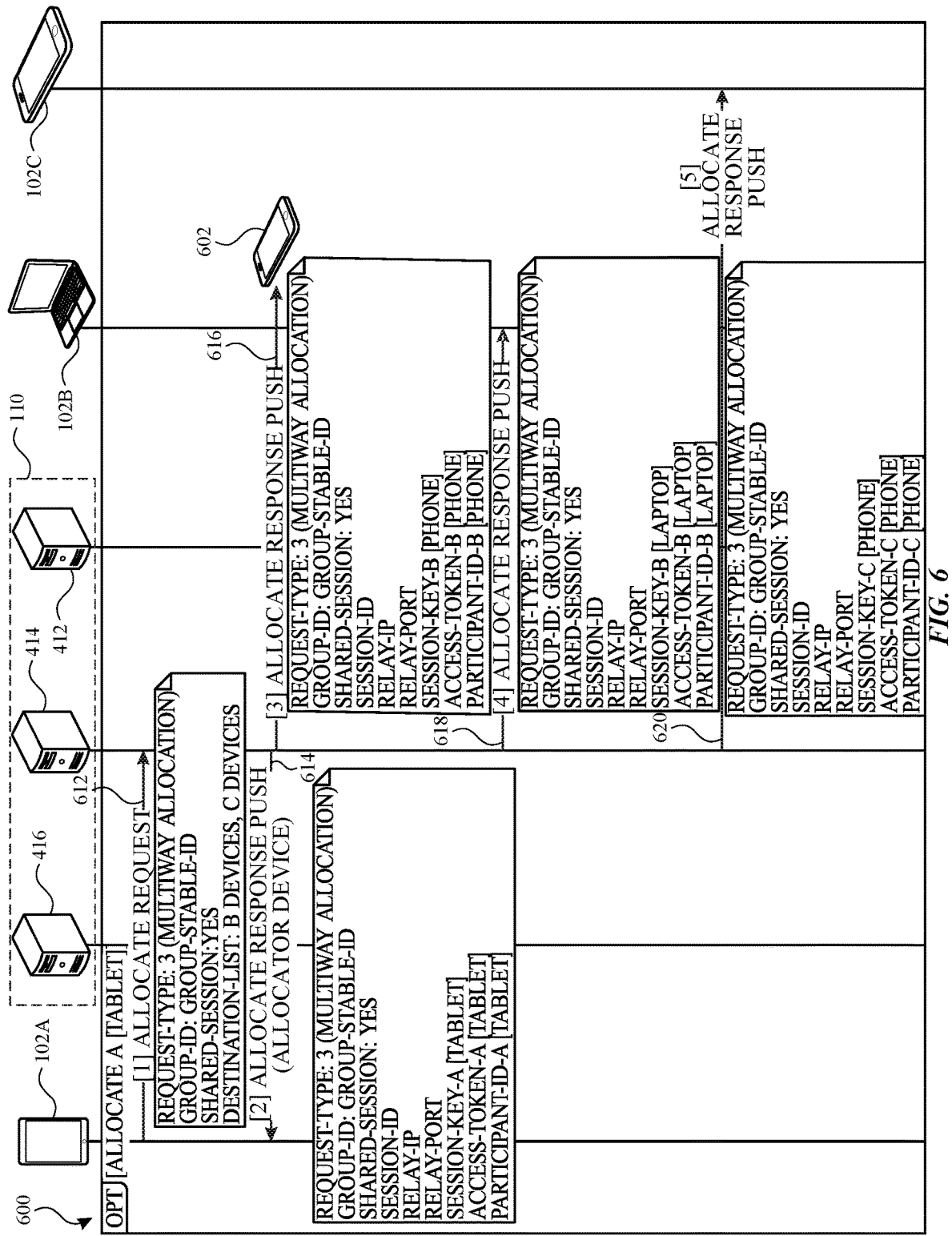
FIGS. 6-14 illustrate flow diagrams of example processes of a multi-device communication management system in accordance with one or more implementations.

FIG. 5 illustrates a flow diagram of an example process 500 of the multi-device communication management system in accordance with one or more implementations. For explanatory purposes, the process 500 is primarily described herein with reference to the electronic devices 102A,D and the server 110 of FIG. 1. However, the process 500 is not limited to the electronic devices 102A,D and/or the server 110. The electronic devices 102A,D and the server 110 are also presented as exemplary devices and the operations described herein may be performed by any suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more of the blocks of the process 500 need not be performed and/or can be replaced by other operations. In one or more implementations, one or more of the operations described as being performed at the server 110 may be performed at least in part at one or more of the electronic devices 102A,D, and vice-versa. In one or more implementations, one or more of the communications between the electronic devices 102A,D may be communicated via a peer-to-peer connection and/or one or more of the communications between the electronic devices 102A,D may be relayed through the server 110, such as over a network.

In the process 500, the electronic device 102A starts performing a task (512). For example, a user of the electronic device 102A may initiate the task on the electronic device 102A (e.g., audio/video conference, audio streaming, document presenting, voice call, etc.). In one or more implementations, the task may be performed in conjunction with the server 110, such as participating in a group communication session, and/or the electronic device 102A may notify the server 110 that it has initiated, and/or is engaging in, the task. In one or more implementations, the task may be a task that the user may wish, at some point, to handoff from one electronic device 102A to another electronic device 102D registered to the account of the user, such when the user is participating in an audio/video conference.

Device capabilities of electronic devices and/or user attention information may indicate that a particular electronic device is capable of having a particular task handed off to it, and/or that a user is intending to handoff a task to a particular electronic device. For example, if a user faces the electronic device 102D, instead of the electronic device 102A, the attention of the user on the electronic device 102D may be an indication that the user would like to handoff the task to the electronic device 102D. The direction the user is facing may be determinable, for example, from an image captured from a camera device, such as a camera device of the electronic device 102A, the electronic device 102D, and/or some other device. In another example, the user may wish to change devices based on the respective capabilities of the devices, e.g. the electronic device 102D may have a larger screen than the electronic device 102A. Thus, the server 110 (and/or the electronic device 102A) may obtain information about device capabilities corresponding to the electronic devices 102A,D, and/or user attention information corresponding to the electronic devices 102A,D (514), and/or any other electronic devices that are registered to the same user account as the electronic device 102A.

In one or more implementations, the server 110 may determine, based at least in part on the received information, a likelihood that the user will request to handoff the task from the electronic device 102A to the electronic device 102D, or another of the electronic devices associated with the account of the user. If the server 110 determines that there is a high likelihood that the user may request to handoff the electronic device 102D and/or to another electronic device, the server 110 may transmit a task handoff preparation request (515) to the electronic device 102D indicating that the electronic device 102D should prepare to receive a possible handoff of the task. Thus, the task handoff preparation request may be received by the electronic device 102D before a request to handoff the task has actually been received.

For example, the server 110 may determine that there is a high likelihood that the user may request to handoff the task to the electronic device 102D when the user is located with a close proximity of the electronic device 102D. The proximity of the user to the electronic device 102D may be determinable from known locations of the electronic devices 102A,D (e.g., from positioning systems), by identifying the user in images and/or audio captured by the electronic device 102D, by determining that the electronic device 102D is able to receive short range wireless signals from the electronic device 102A, e.g. NFC and/or Bluetooth, and/or by any other positioning mechanisms. Alternatively, and/or in addition, the server 110 may determine that there is a high likelihood that the user may request to handoff the task when the user begins interacting with the electronic device 102D while engaging in the task on the electronic device 102A, such as when the user opens, unlocks, and/or logs into the electronic device 102D, and/or conversely when the user closes, locks, and/or logs out of the electronic device 102A.

In one or more implementations, when the electronic device 102D receives the task handoff preparation request from the server 110, the electronic device 102D may perform one or more preliminary operations to prepare to receive a handoff of the task. The preliminary operations may include, for example, the allocation/join processes described above with respect to FIGS. 6-13, exiting a low power mode, powering on one or more transceivers, connection establishment, e.g. for an audio and/or video conference/call, connecting to a network with a particular quality of service and/or bandwidth, powering on audio and/or video encoders/decoders, powering on/preparing one or more audio and/or video output devices, launching an application associated with the task, reserving processor and/or memory resources for performing the task, and the like. For example, if the electronic device 102D is engaged in a background operation that requires a significant amount of processing, memory, or network bandwidth, such as downloading an update, or the like, the electronic device 102D may pause the background operation in anticipation of receiving a handoff of the task.

In one or more implementations, the server 110 may coordinate one or more security operations to prepare the electronic device 102D to receive a handoff of the task. For example, the task may require authenticating with the server 110 and/or another server, and/or receiving one or more security keys for participating in the task, such as keys for joining/participating in an audio/video conference. Thus, the server 110 may coordinate obtaining the appropriate security keys and/or the performing the appropriate authentication protocols for the electronic device 102D and/or any other electronic devices registered to the account of the user.

The server 110 may provide the electronic device 102A with information regarding which other electronic devices the task can be handed off to, such as the electronic device 102D. The electronic devices that the task can be handed off to may include, for example, other devices registered to the account of the user. When the user wishes to handoff the task to another electronic device, such as the electronic device 102D, the electronic device 102A may receive user input indicating a request to handoff the task (516). For example, the electronic device 102A may display to the user a list of the electronic devices that the task can be handed off to, e.g. as indicated by the server 110, and the user may select one of the electronic devices, such as the electronic device 102D, to initiate handing off the task.

After receiving the request to handoff the task, the electronic device 102A transmits a task handoff request to the electronic device 102D that requests that the electronic device 102D prepare to receive the task being performed at the electronic device 102A (518). When the task handoff request is received by the electronic device 102D, the electronic device 102D prepares to receive the task being performed by the electronic device 102A (520). In one or more implementations, when the server 110 has already transmitted the task handoff preparation request to the electronic device 102D (515), the electronic device 102D may already be prepared and/or substantially prepared to receive the handoff of the task when the task handoff request is received. Thus, the electronic device 102D may be prepared to receive the handoff of the task with minimal or no latency upon receiving the task handoff request.

When the electronic device 102D is ready to receive the handoff of the task (which may be immediately upon receiving the task handoff request), the electronic device 102D may transmit a task handoff ready indication to the electronic device 102A to indicate that the electronic device 102D is ready to receive the handoff of the task (524). Upon receiving the task handoff ready indication (526), the electronic device 102A may initiate handing off the task to the electronic device 102D (528). The handoff of the task may include transferring task state information, such as application state information, to the electronic device 102D, such as via the server 110. In one or more implementations, the server 110 may coordinate handing off the task. For example, the server 110 may monitor/store state information corresponding to the task being performed at the electronic device 102A and the server 110 may communicate the task state information to the electronic device 102D.

The electronic device 102D receives the task state information, e.g. from the electronic device 102A and/or from the server 110, and the electronic device 102D continues the task. When the server had already transmitted the task handoff preparation request (515) to the electronic device 102D prior to the electronic device 102A transmitting the task handoff request (518), there may be little or no latency between the time when the user requests that the task be handed off (516) and the task continuing on the electronic device 102D (530). Thus, the user may experience a seamless transition from performing the task using the electronic device 102A to continuing the task using the electronic device 102D.

In one or more implementations, when the electronic device 102D initiates the continuation of the task, the electronic device 102D may transmit, to the electronic device 102A, a task handoff confirmation indicating that the electronic device 102D has continued the task (532). The electronic device 102A may stop performing the task when the task handoff confirmation is received (534). Thus, in one or more implementations, the task may be performed concurrently on the electronic device 102A and the electronic device 102D for a minimal amount of time during the handoff process. The server 110 may determine that the one of the electronic devices 102A,D that the user is currently touching, typing, or interacting with is the active electronic device, and the server 110 may only transmit communications to the active electronic device.

In one or more implementations, both of the electronic devices 102A,D may be concurrently considered the active electronic device. If a signal has been determined from the activity of the user that indicates that the user will likely no longer be engaging with one or more of the electronic device 102A, e.g. logging out, locking, closing, powering down, etc., that electronic device may no longer be considered an active electronic device.

FIGS. 6-14 illustrate flow diagrams of example processes 600-1400 of the multi-device communication management system in accordance with one or more implementations. For explanatory purposes, the processes 600-1400 are primarily described herein with reference to the electronic devices 102A-C, and the server 110 of FIGS. 1-4, where the server 110 may include and/or represent one or more of a relay server 412, an allocator server 414, or a notification server 416. However, the processes 600-1400 are not limited to the electronic devices 102A-C and/or the server 110, and one or more blocks (or operations) of the processes 600-1400 may be performed by one or more other components of the electronic devices 102A-C and/or the server 110. The electronic devices 102A-C and/or the server 110 are also presented as exemplary devices and the operations described herein may be performed by any suitable devices. In one or more implementations, the electronic devices 102A-C may communicate with one another directly and/or via a server (e.g., the server 110). Further for explanatory purposes, the blocks of the processes 600-1400 are described herein as occurring in serial, or linearly. However, multiple blocks of the processes 600-1400 may occur in parallel. In addition, the blocks of the processes 600-1400 need not be performed in the order shown and/or one or more of the blocks of the processes 600-1400 need not be performed and/or can be replaced by other operations.

The process 600 illustrates allocation of a session, such as an audio/video communication session, for the electronic device 102A. For example, the electronic device 102A may be participating in a group messaging session with the electronic devices 102B-C, and the electronic device 102A may request that the group messaging session be transitioned to an audio/video communication session.

In the process 600, the electronic device 102A transmits an allocation request to the allocator server 414 (612), requesting allocation of a session, such as an audio/video communication session. The allocation request may include a request type indicating a multi-way allocation involving multiple electronic devices, a group identifier (ID) for the electronic device 102A, a stable ID for the electronic device 102A, a shared-session indicator, and/or a destination list. The group ID is an identifier that is assigned to the electronic device 102A when the electronic device 102A joins a group for group communication, such as a messaging communication group, and may expire when the electronic device 102A leaves the group. The stable ID is a persistent identifier for the electronic device 102A that does not change regardless of whether the electronic device 102A joins or leaves a group. The destination list may identify other devices (e.g., the electronic devices 102B and 102C, and/or other devices associated with the same user account as the electronic device 102B or 102C) to receive an allocation response.

When the allocator server 414 receives the allocation request from the electronic device 102A, the allocator server 414 determines whether a session (e.g., a quick relay (QR) session) exists that the electronic device 102A may participate in, for example, if one or more of the electronic devices 102B-C has already initiated a session. If there is no existing session, the allocator server 414 may allocate a new session. Thus, in response to the allocation request, the allocator server 414 allocates a session and transmits, to the electronic device 102A, an allocation response with the credential information needed for the electronic device 102A to join the session (614). The allocator server 414 may also transmit an allocation response to each of the other electronic devices identified on the destination list.

Thus, the allocator server 414 may transmit, to the electronic device 102B, an allocation response with the credential information needed for the electronic device 102B (e.g., Laptop) to join the session (616) and may transmit an allocation response to another electronic device 602 (e.g., a phone) that is associated with the same user account as the electronic device 102B (618). Further, the allocator server 414 may also transmit, to the electronic device 102C, an allocation response with the credential information needed for the electronic device 102C to join the session (620). Each allocation response may include the request type indicating the multi-way allocation, the group ID, the stable ID, and a participant ID for a corresponding electronic device, and a session ID identifying the session. The credential information included in each allocation response may include a session key and an access token for a corresponding electronic device.

Figure 7:
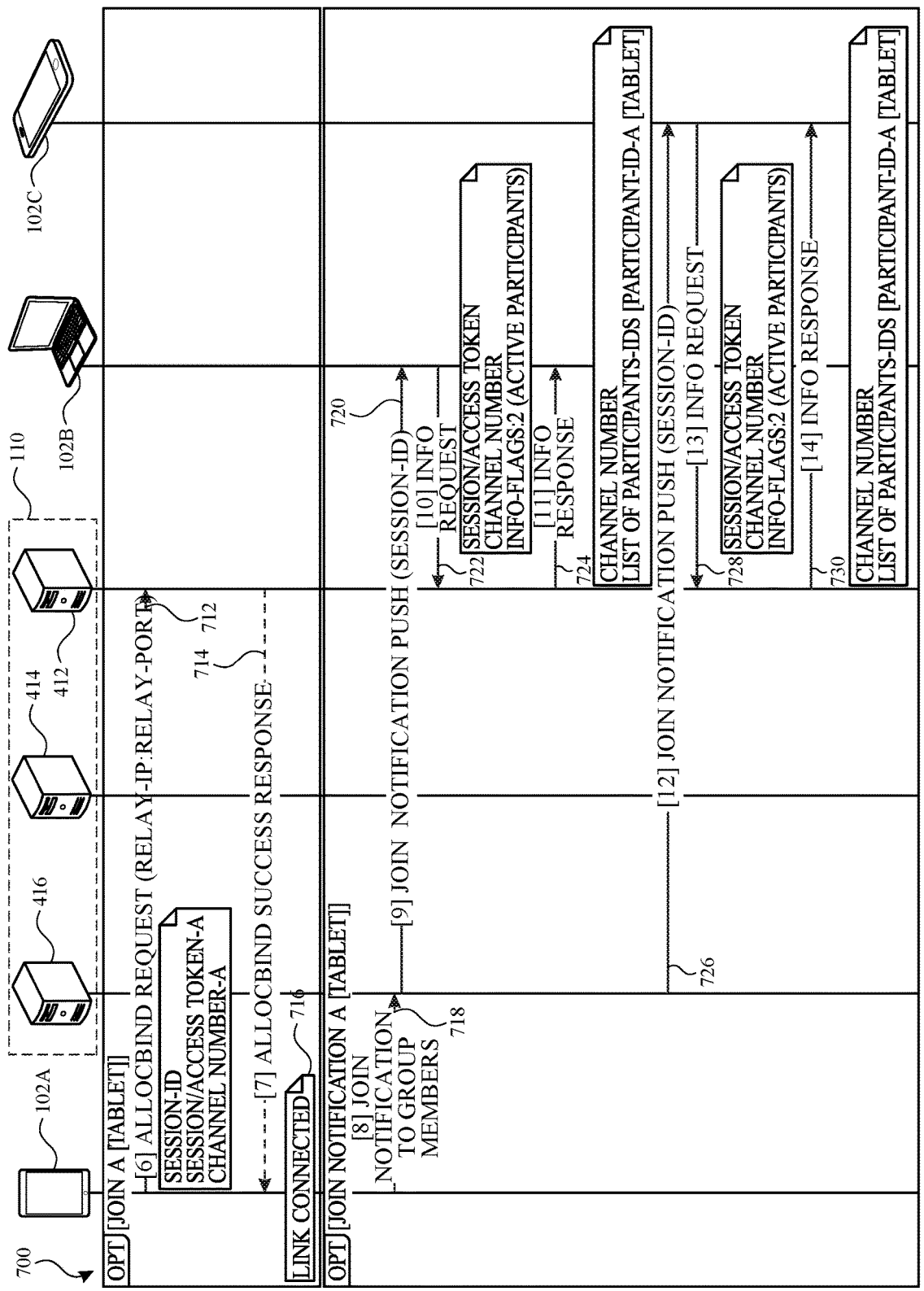

The process 700 of FIG. 7 may continue after the process 600. The process 700 illustrates a process for the electronic device 102A to join a session. The electronic device 102A transmits, to the relay server 412, an allocation bind request with the credential information of the electronic device 102A (712), in order to join the session using the credential information. In response to the allocation bind request, the relay server 412 transmits an allocation bind success response to the electronic device 102A (714), to indicate that the electronic device 102A has joined the session. When the electronic device 102A receives the allocation bind success response, the electronic device 102A determines that the electronic device 102A has joined the session (716).

When the electronic device 102A has joined the session, the electronic device 102A transmits a join notification to members of the group via the notification server 416. In particular, the electronic device 102A transmits a join notification to the notification server 416 (718). The notification server 416 transmits the join notification of the electronic device 102A with a session ID to the electronic device 102B (720), where the session ID identifies the session that the electronic device 102A has joined.

When the electronic device 102B receives the join notification, the electronic device 102B transmits an information request to the relay server 412 to request information about the electronic device 102A (722). The information request may include a session key and/or an access token, and a request for information on participants of the session identified by the session ID included in the join notification. The information request may also include a channel number for the session. In response, the relay server 412 transmits an information response to the electronic device 102B (724), where the information response may include participant IDs identifying devices that are participating in the session (e.g., a participant ID of the electronic device 102A). The information response may further include the channel number for the session.

Further, the notification server 416 transmits the join notification of the electronic device 102A with the session ID to the electronic device 102C (726), where the session ID identifies the session that the electronic device 102A has joined. When the electronic device 102C receives the join notification, the electronic device 102C may transmit an information request to the relay server 412 to request information about the electronic device 102A (728). The information request may include a session key and/or an access token, and a request for information on participants of the session identified by the session ID included in the join notification. The information request may also include a channel number for the session. In response, the relay server 412 transmits an information response to the electronic device 102C (730), where the information response may include participant IDs identifying devices that are participating in the session (e.g., a participant ID of the electronic device 102A). The information response may further include the channel number for the session.

Figure 8:
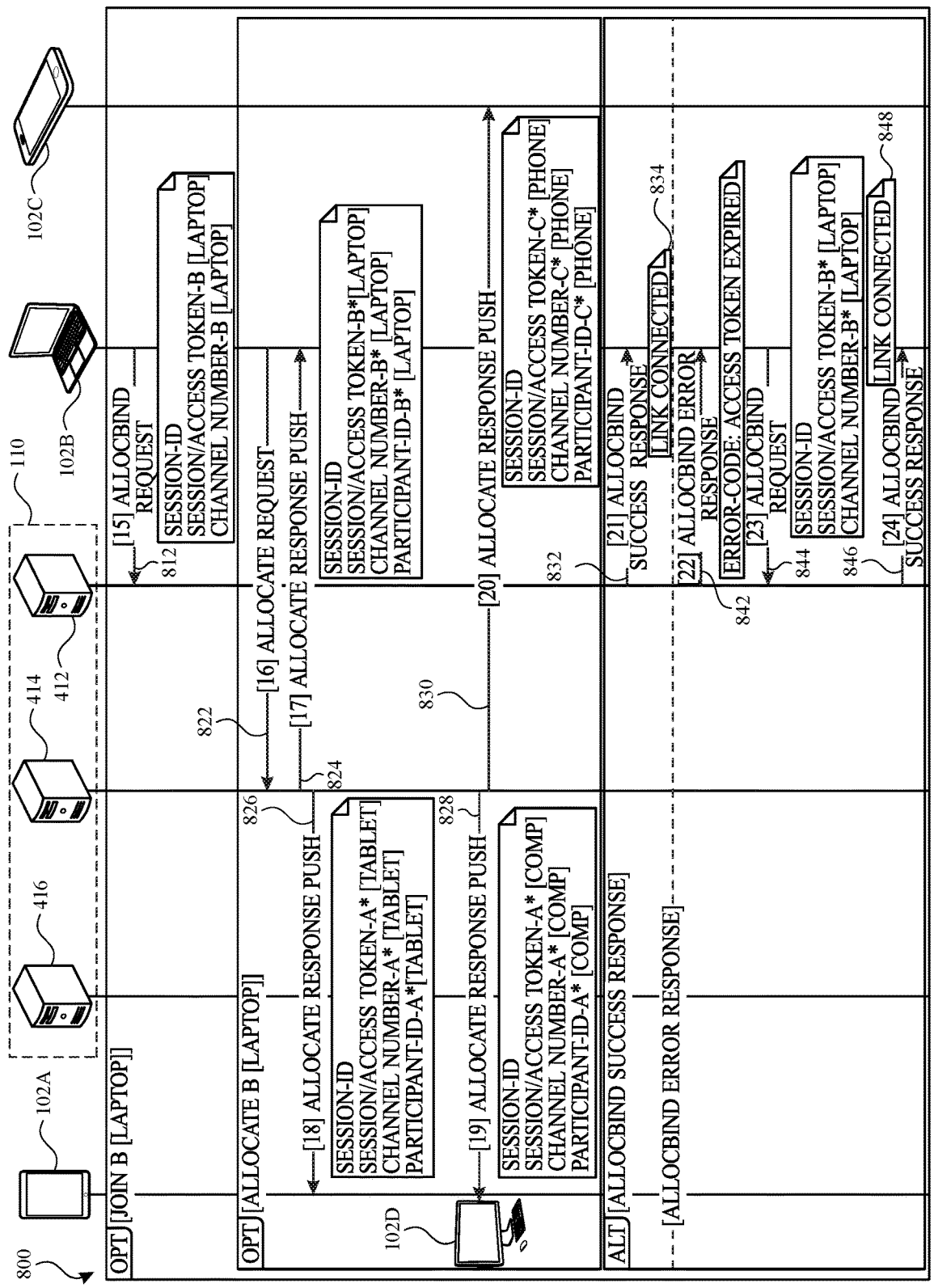

The process 800 of FIG. 8 may continue after the process 700. The process 800 illustrates a process for the electronic device 102B to join a session that the electronic device 102A has joined. When the electronic device 102B attempts to join a session that was initiated by the electronic device 102A, the electronic device 102B transmits an allocation bind request to the relay server 412 (812). The allocation bind request may include the session ID identifying the session and a session key and/or an access token used for joining the session.

The electronic device 102B may perform an allocation process for joining the session. The electronic device 102B transmits an allocation request to the allocator server 414 (822) for allocation of the session. In response, the allocator server 414 allocates the session and transmits, to the electronic device 102B, an allocation response with the credential information needed for the electronic device 102A to use to join the session (824). The allocation response may include a session ID and a participant ID of the electronic device 102B. The allocator server 414 may transmit an allocation response to the electronic device 102A (826), where the allocation response may include a participant ID of the electronic device 102A. The allocator server 414 may also transmit an allocation response to the electronic device 102D that is associated with the same user account as the electronic device 102A (828), where the allocation response may include a participant ID of the electronic device 102D. Therefore, the allocation process may be performed at both the electronic device 102A and the electronic device 102D, such that the session can be quickly handed off from the electronic device 102A to the electronic device 102D. Further, the allocator server 414 may transmit an allocation response to the electronic device 102B (830).

In response to the allocation bind request, the relay server 412 transmits an allocation bind success response to the electronic device 102B (832), to indicate that the electronic device 102B has joined the session. When the electronic device 102B receives the allocation bind success response, the electronic device 102B determines that the electronic device 102B has joined the session (834).

In one scenario, if the access token provided via the allocation bind request has expired, the relay server 412 denies the allocation bind request and transmits an allocation bind error response to the electronic device 102B, where the allocation bind error response indicates that the access token has expired (842). Then, the electronic device 102B may transmit another allocation bind request with an updated access token to the relay server 412 (844). If the relay server 412 authenticates the updated access token, the relay server 412 transmits an allocation bind success response to the electronic device 102B, to indicate that the electronic device 102B has joined the session (846). When the electronic device 102B receives the allocation bind success response, the electronic device 102B determines that the electronic device 102B has joined the session (848).

Figure 9:
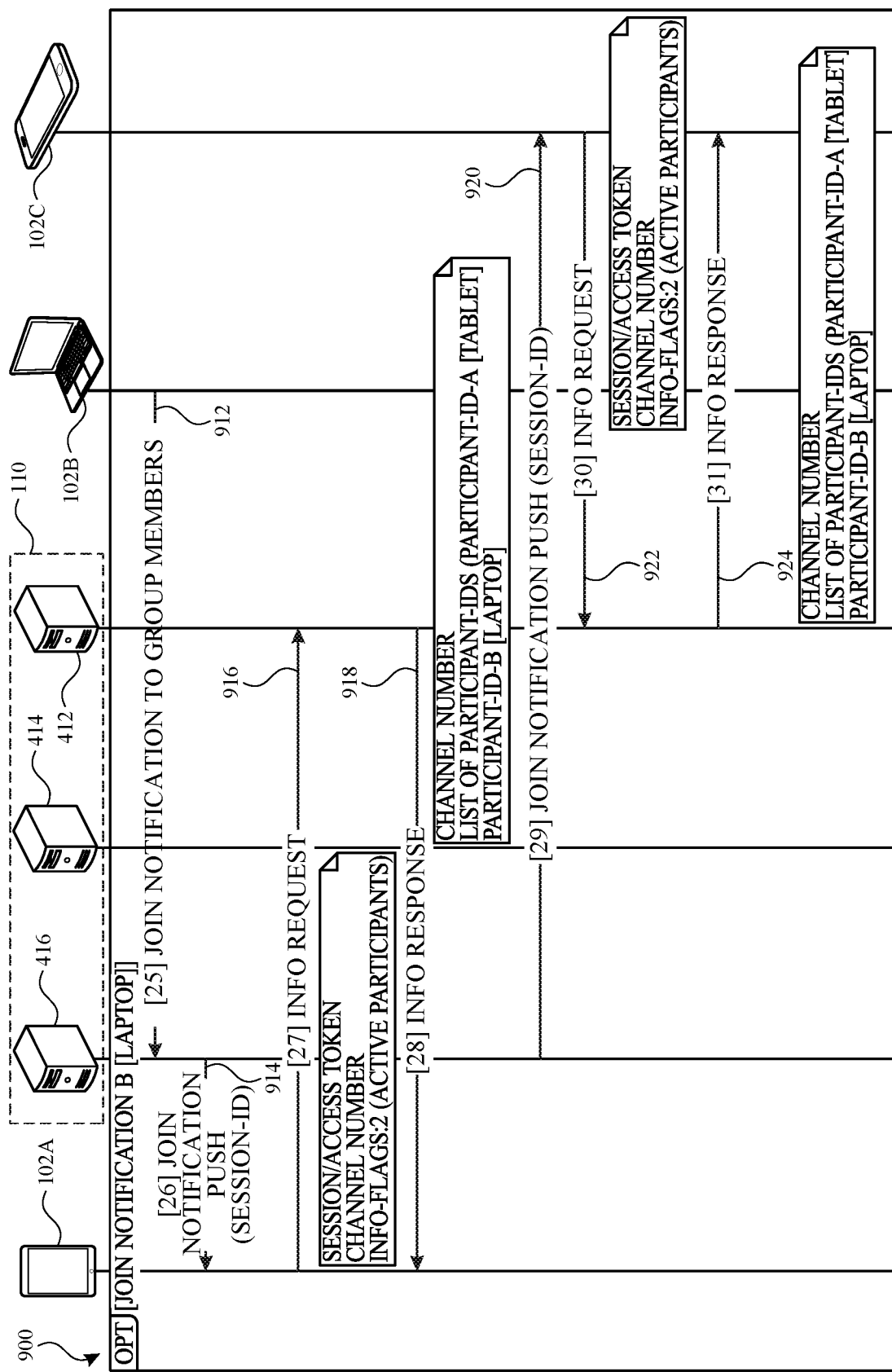

The process 900 of FIG. 9 may continue after the process 800. The process 900 illustrates a process involving a join notification. When the electronic device 102B has joined the session, the electronic device 102B transmits a join notification to members of the group via the notification server 416. In particular, the electronic device 102B transmits a join notification to the notification server 416 (912). The notification server 416 transmits the join notification of the electronic device 102B with the session ID to the electronic device 102A (914), where the session ID identifies the session that the electronic device 102B has joined.

When the electronic device 102A receives the join notification, the electronic device 102A transmits an information request to the relay server 412 to request information about the electronic device 102B (916). The information request may include a session key and/or an access token, and a request for information on participants of the session identified by the session ID included in the join notification. The information request may also include a channel number for the session. In response, the relay server 412 transmits an information response to the electronic device 102A (918), where the information response may include participant IDs identifying devices that are participating in the session (e.g., a participant ID of the electronic device 102A). The information response may further include the channel number for the session.

Further, the notification server 416 transmits the join notification of the electronic device 102B with the session ID to the electronic device 102C (920), where the session ID identifies the session that the electronic device 102B has joined. When the electronic device 102C receives the join notification, the electronic device 102C may transmit an information request to the relay server 412 to request information about the electronic device 102B (922). The information request may include a session key and/or an access token, and a request for information on participants of the session identified by the session ID included in the join notification. The information request may also include a channel number for the session. In response, the relay server 412 transmits an information response to the electronic device 102C (924), where the information response may include participant IDs identifying devices that are participating in the session (e.g., a participant ID of the electronic device 102B). The information response may further include the channel number for the session.

Figure 10:
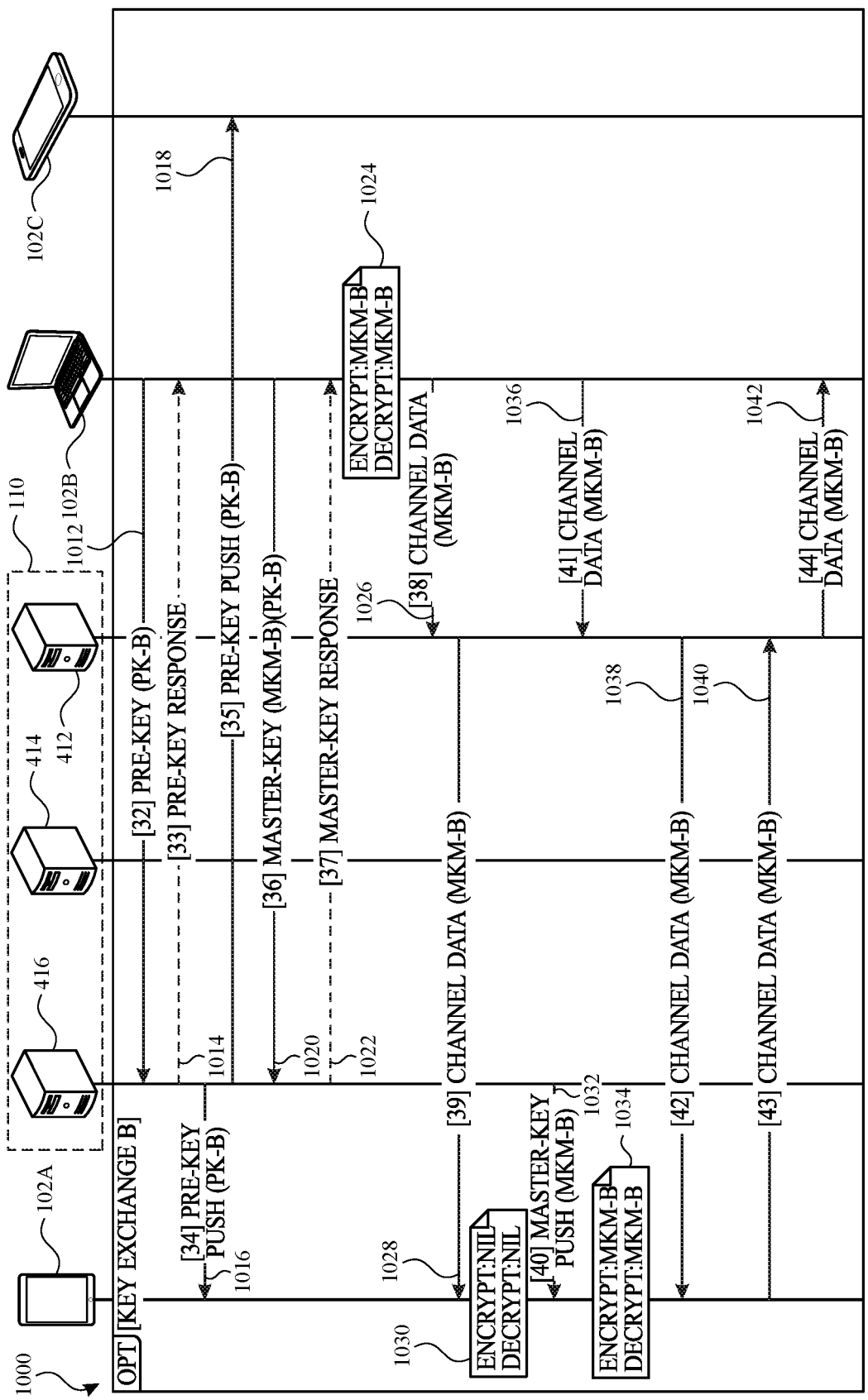

The process 1000 of FIG. 10 may continue after the process 900. The process 1000 illustrates a key exchange process for the electronic device 102B. An electronic device in the session may share a pre-key of the electronic device with active participants of the session. In the process 1000, the active participants of the session are the electronic devices 102A-C. The electronic device 102B transmits a pre-key of the electronic device 102B to the notification server 416 (1012). The notification server 416 may transmit a pre-key response to the electronic device 102B to indicate that the pre-key has been received (1014). When the notification server 416 receives the pre-key, the notification server 416 forwards the pre-key to other electronic devices in the session. In particular, the notification server 416 forwards the pre-key to the electronic device 102A (1016) and to the electronic device 102C (1018). The notification server 416 may transmit a pre-key response to the electronic device 102B to indicate that the pre-key has been received (1014).

After transmitting the pre-key to the other electronic devices via the notification server 416, the electronic device 102B generates a master key based on the pre-key and transmits the master key to the notification server 416 (1020). The notification server 416 may transmit a master key response to the electronic device 102B to indicate that the master key has been received (1022).

After the master key has been provided to the notification server 416, the electronic device 102B may encrypt data with the master key (1024). The electronic device 102B may transmit the encrypted data to another device via the relay server 412. For example, the electronic device 102B may transmit the encrypted data to the relay server 412 (1026), and the relay server 412 may forward the encrypted data to the electronic device 102A (1028). The electronic device 102A may not yet have the master key to decrypt the encrypted data (1030). The notification server 416 transmits the master key to the electronic device 102A (1032). Then, the electronic device 102A may decrypt the encrypted data using the master key (1034).

When both of the electronic devices 102A and 102B have the master key, the electronic devices 102A and 102B may perform encrypted data communication with each other. For example, the electronic device 102B may transmit another encrypted data to the relay server 412 (1036), and the relay server 412 may forward the encrypted data to the electronic device 102A (1038). The electronic device 102A may transmit another encrypted data to the relay server 412 (1040), and the relay server 412 may forward the encrypted data to the electronic device 102B (1042).

Figure 11:
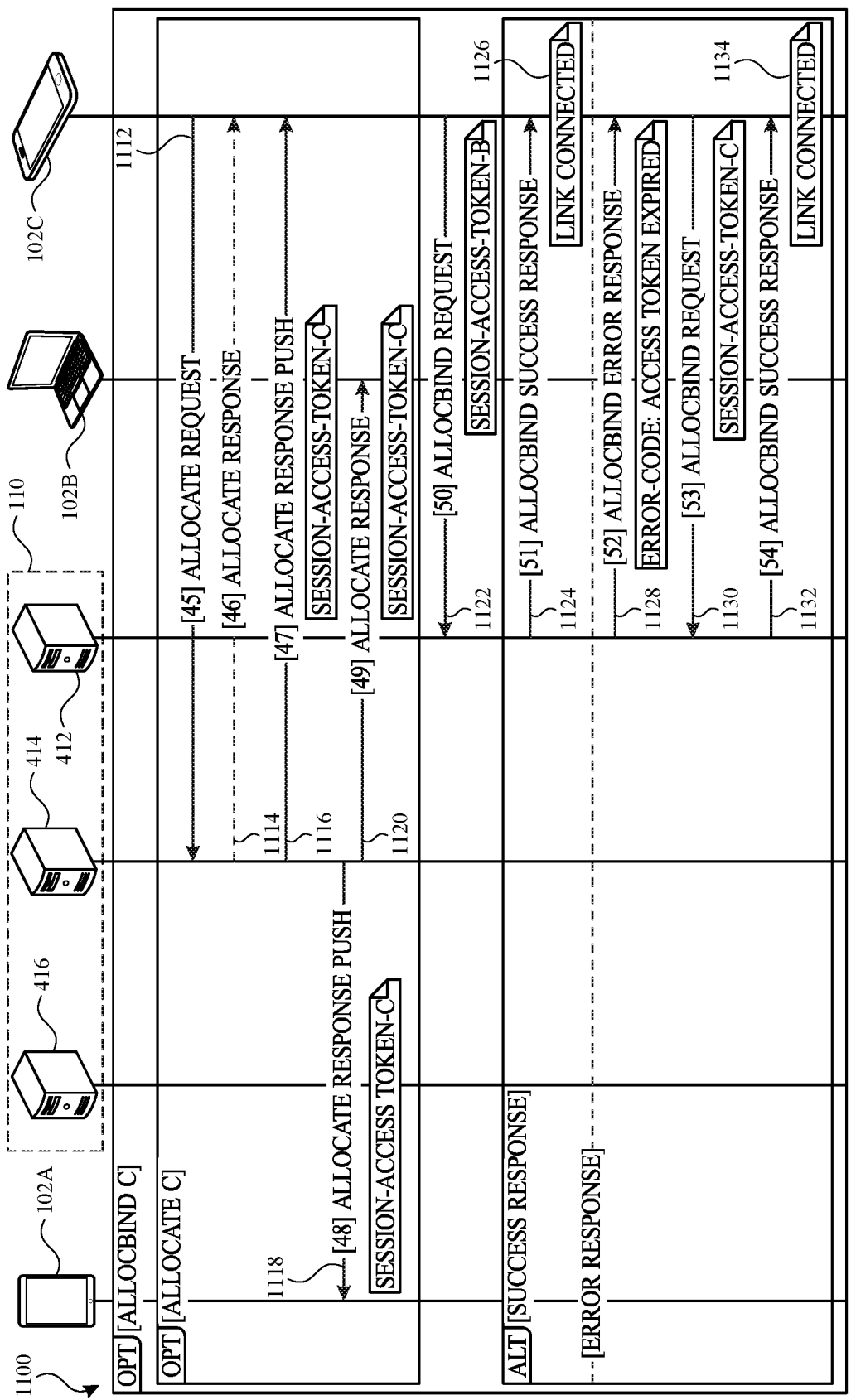

The process 1100 of FIG. 11 may continue after the process 1000. The process 1100 illustrates an allocation bind process for the electronic device 102C. The electronic device 102C may perform an allocation process for joining the session started by the electronic device 102A. In particular, the electronic device 102C transmits an allocation request to the allocator server 414 (1112). The allocator server 414 may transmit an allocation response to indicate that the allocator server 414 has received the allocation request (1114). In response to the allocation request, the allocator server 414 transmits, to the electronic device 102C, an allocation response with the credential information needed for the electronic device 102C to use to join the session (1116). The allocator server 414 may transmit, to the electronic device 102A, an allocation response with the credential information needed for the electronic device 102C to use to join the session (1118). Further, the allocator server 414 may transmit, to the electronic device 102B, an allocation response with the credential information needed for the electronic device 102C to use to join the session (1120).

The electronic device 102C may transmit, to the relay server 412, an allocation bind request with the credential information of the electronic device 102C (1122), in order to join the session using the credential information (1122). In response to the allocation bind request, the relay server 412 transmits an allocation bind success response to the electronic device 102C (1124), to indicate that the electronic device 102C has joined the session. When the electronic device 102C receives the allocation bind success response, the electronic device 102C determines that the electronic device 102C has joined the session (1126).

In one scenario, if the access token provided via the allocation bind request has expired, the relay server 412 denies the allocation bind request and transmits an allocation bind error response to the electronic device 102C, where the allocation bind error response indicates that the access token has expired (1128). Then, the electronic device 102C may transmit another allocation bind request with an updated access token to the relay server 412 (1130). If the relay server 412 authenticates the updated access token, the relay server 412 transmits an allocation bind success response to the electronic device 102C, to indicate that the electronic device 102C has joined the session (1132). When the electronic device 102C receives the allocation bind success response, the electronic device 102C determines that the electronic device 102C has joined the session (1134).

Figure 12:
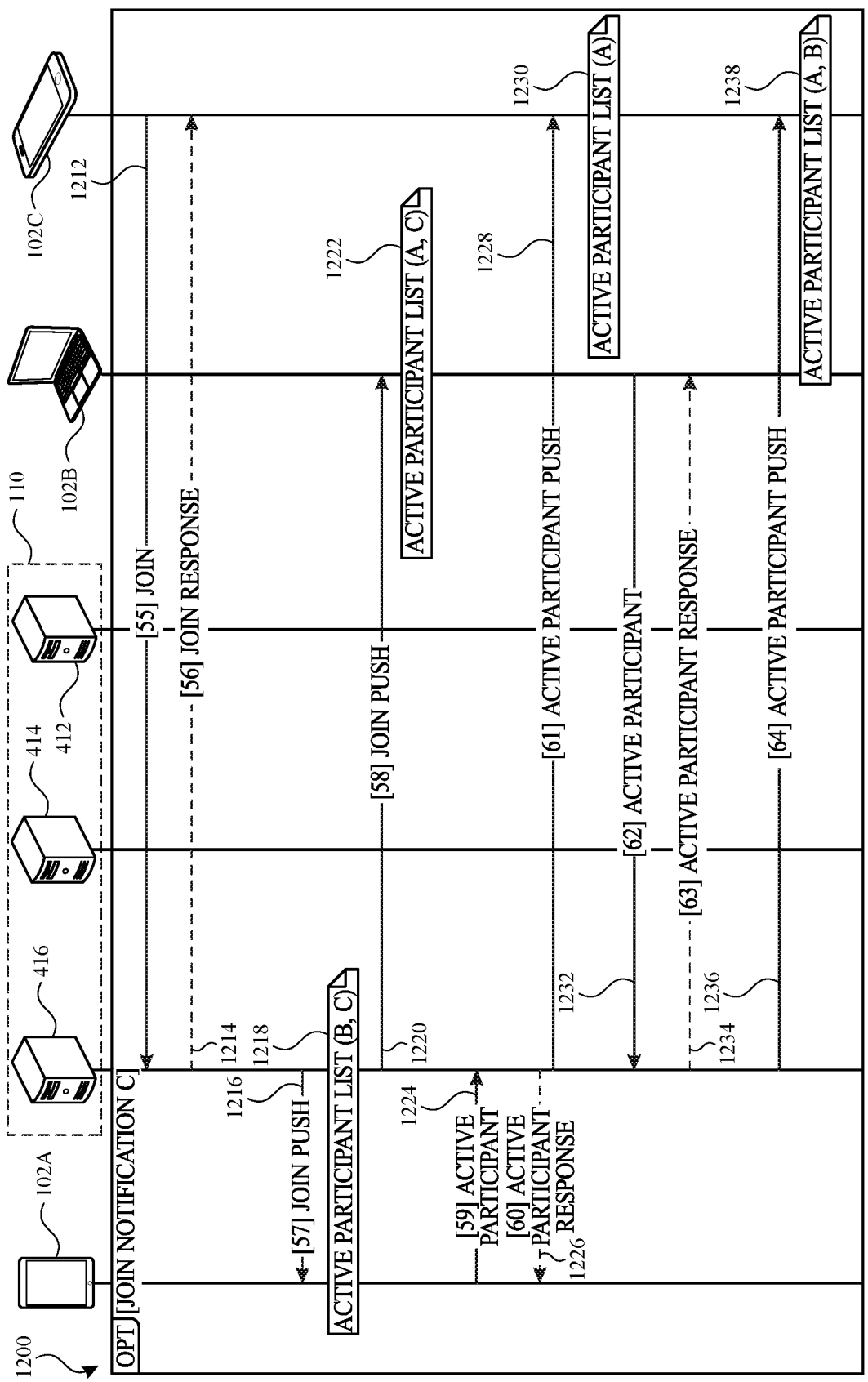

The process 1200 of FIG. 12 may continue after the process 1100. The process 1200 illustrates a join process for the electronic device 102C to become an active participant of a group communication started by one or more of the electronic devices 102A and 102B. The electronic device 102C transmits a join message to the notification server 416 (1212). In response, the notification server 416 may transmit a join response to the electronic device 102C to indicate that the notification server 416 has received the join message (1214).

The notification server 416 forwards the join message to the other electronic devices 102A-D. In particular, the notification server 416 forwards the join message to the electronic device 102A (1216). In response, the electronic device 102A updates its active participant list to include the electronic devices 102B and 102C as active participants with the electronic device 102A (1218). The notification server 416 forwards the join message to the electronic device 102B (1220). In response, the electronic device 102B updates its active participant list to include the electronic devices 102A and 102C as active participants with the electronic device 102B (1222).

Further, to update the active participant list of the electronic device 102C, the other devices may send active participant notifications to the electronic device 102C. In particular, the electronic device 102A transmits an active participant notification to the notification server 416 (1224). The notification server 416 may transmit an active participant notification response to the electronic device 102A to indicate that the notification server 416 has received the active participant notification (1226). The notification server 416 forwards the active participant notification to the electronic device 102C (1228). Then, the electronic device 102C updates its active participant list to indicate that the electronic device 102A is an active participant with the electronic device 102C (1230).

Subsequently, the electronic device 102B transmits an active participant notification to the notification server 416 (1232). The notification server 416 may transmit an active participant notification response to the electronic device 102B to indicate that the notification server 416 has received the active participant notification (1234). The notification server 416 forwards the active participant notification to the electronic device 102C (1236). Then, the electronic device 102C updates its active participant list to indicate that the electronic devices 102A and 102B are active participants with the electronic device 102C (1238).

Figure 13:
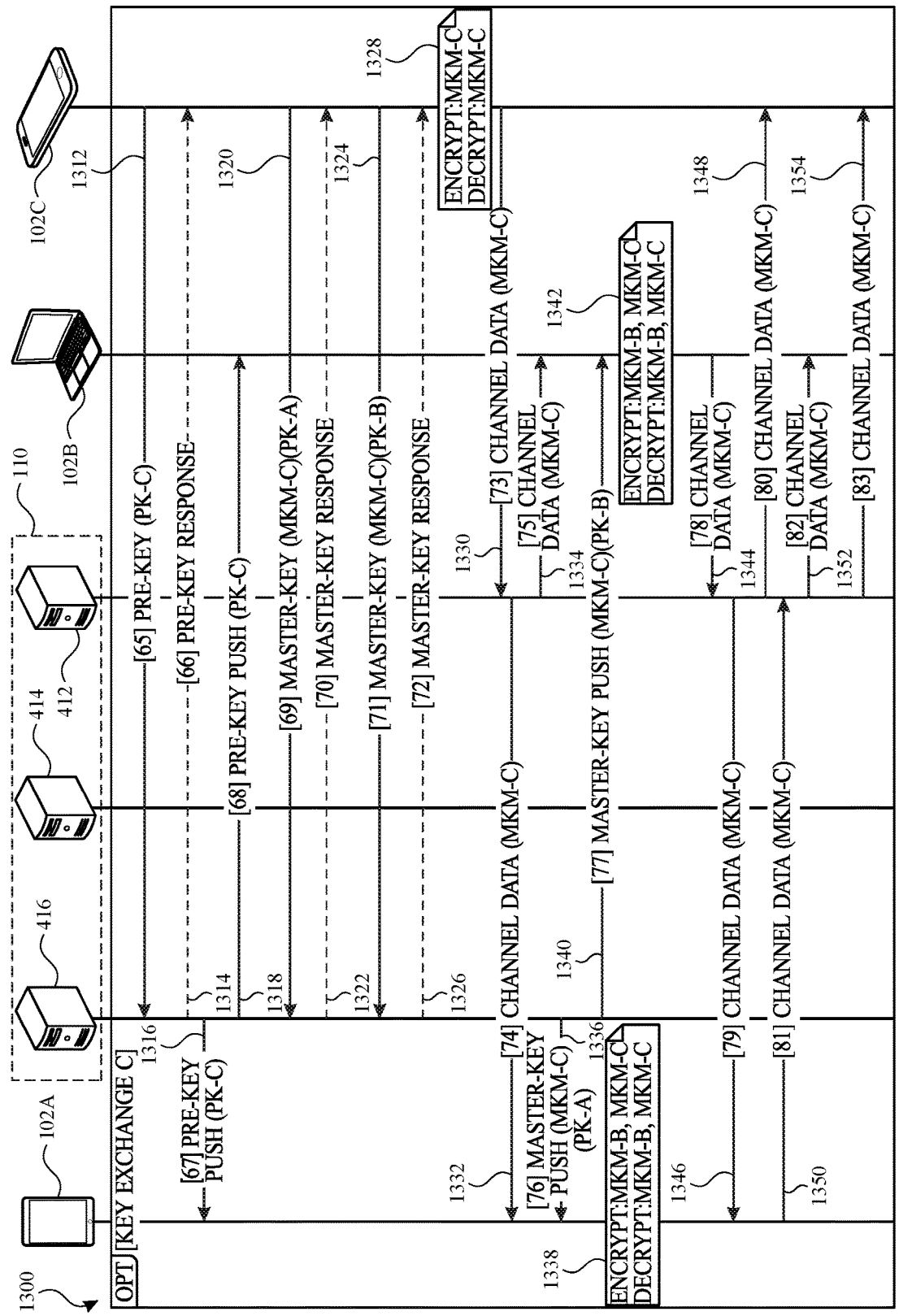

The process 1300 of FIG. 13 may continue after the process 1200. The process 1300 illustrates a key exchange process for the electronic device 102C. An electronic device in the session may share a pre-key of the electronic device with the active participants. In the process 1200, the active participants are the electronic devices 102A-C, and thus the electronic device 102C may share a pre-key of the electronic device 102C with the electronic devices 102A-B. In particular, the electronic device 102C transmits the pre-key of the electronic device 102C to the notification server 416 (1312). In response, the notification server 416 may transmit a pre-key response to the electronic device 102C to indicate that the notification server 416 has received the pre-key (1314). The notification server 416 forwards the pre-key of the electronic device 102C to the electronic device 102A (1316) and to the electronic device 102B (1318).

The electronic device 102C generates a master key based on a pre-key of the electronic device 102A and sends the master key to the notification server 416 (1320). In response, the notification server 416 may transmit a master key response to the electronic device 102C to indicate that the notification server 416 has received the master key (1322). The electronic device 102C generates a master key based on a pre-key of the electronic device 102B and sends the master key to the notification server 416 (1324). In response, the notification server 416 may transmit a master key response to the electronic device 102C to indicate that the notification server 416 has received the master key (1326).

The electronic device 102C may encrypt data using the master key of the electronic device 102C (1328). The electronic device 102C may transmit the encrypted data to the relay server 412 (1330), and the relay server 412 then forwards the encrypted data to the electronic device 102A (1332) and to the electronic device 102B (1334). The notification server 416 transmits, to the electronic device 102A, the master key of the electronic device 102C based on the pre-key of the electronic device 102A (1336). The electronic device 102A decrypts the encrypted data using the master key (1338). The notification server 416 transmits, to the electronic device 102B, the master key of the electronic device 102C based on the pre-key of the electronic device 102B (1340). The electronic device 102B decrypts the encrypted data using the master key (1342).

After distributing the master key, the electronic devices 102A-C may perform encrypted communication with one another. For example, the electronic device 102B transmits an encrypted data to the relay server 412 (1344), and the relay server 412 then forwards the encrypted data to the electronic device 102A (1346) and to the electronic device 102C (1348). For example, the electronic device 102A transmits an encrypted data to the relay server 412 (1350), and the relay server 412 then forwards the encrypted data to the electronic device 102B (1352) and to the electronic device 102C (1354).

Figure 14:
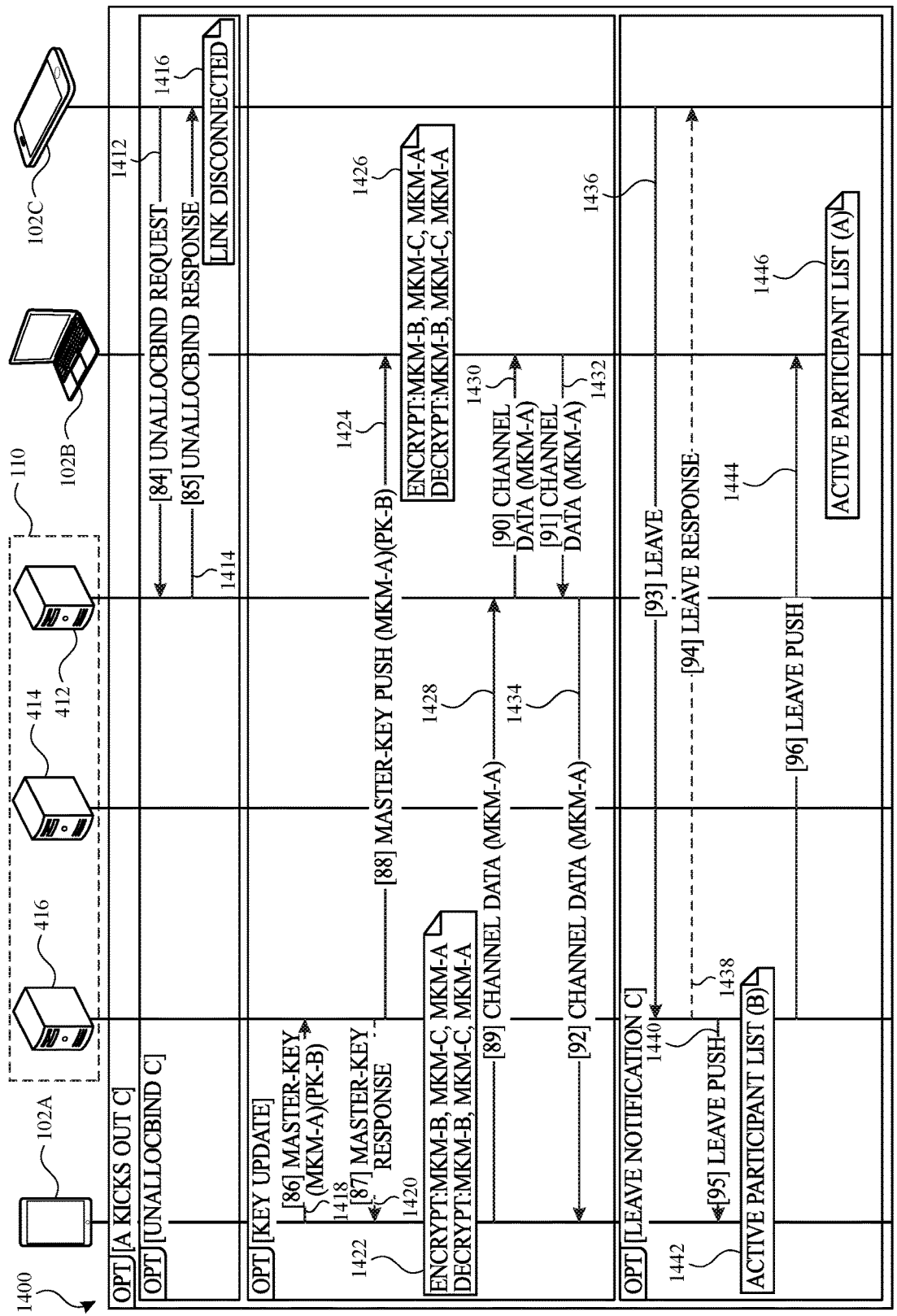

The process 1400 of FIG. 14 may continue after the process 1300. The process 1400 illustrates a process when the electronic device 102C is requested to leave the group communication. The electronic device 102A may request the electronic device 102C to leave the group communication, which prompts the electronic device 102C to transmit an unbind allocation request to the relay server 412 (1412). In response, the relay server 412 transmits an unbind allocation response to the electronic device 102C (1414) to indicate that the electronic device 102C is no longer in the session for the group communication. Then, the electronic device 102C disconnects the link for the group communication with the electronic devices 102A and 102B (1416)

After an electronic device leaves the session, other electronic devices in the session may update, or roll, the master key, and/or any other shared keys, such that the electronic device that is no longer in the session will not be able to join the session or communicate with the other devices. In the process 1400, the notification server 416 transmits, to the notification server 416, an updated master key of the electronic device 102A based on the pre-key of the electronic device 102B (1418). The notification server 416 may transmit a master key response to the electronic device 102A to indicate that the updated master key has been received (1420). The electronic device 102A may encrypt data with the updated master key (1422). The notification server 416 forwards the updated master key to the electronic device 102B (1424). The electronic device 102B may encrypt data with the updated master key (1426).

Thus, the electronic devices 102A and 102B may use the updated master key to encrypt data for communication with each other. For example, the electronic device 102A transmits an encrypted data to the relay server 412 (1428), and the relay server 412 then forwards the encrypted data to the electronic device 102B (1430). For example, the electronic device 102B transmits an encrypted data to the relay server 412 (1432), and the relay server 412 then forwards the encrypted data to the electronic device 102A (1434).

The electronic device 102C may notify the group that the electronic device 102C has left. In particular, the electronic device 102C transmits a leave notification to the notification server 416 (1436). The notification server 416 may transmit a leave notification response to the electronic device 102C (1438) to indicate that the notification server 416 has received the leave notification. Then, the notification server 416 forwards the leave notification to the electronic device 102A (1440). In response to the leave notification, the electronic device 102A updates the active participant list to remove the electronic device 102C from the active participant list (1442). The notification server 416 also forwards the leave notification to the electronic device 102B (1444). In response to the leave notification, the electronic device 102A updates the active participant list to remove the electronic device 102C from the active participant list (1446).

In one or more implementations, one or more of the messages and/or requests described above in FIGS. 6-14 may be, and/or may include, an array. For example, identity requests/queries may be transmitted as an array, such that multiple identity requests can be packaged/transmitted in a consolidated format via a single array, thereby reducing the amount of time and/or overhead required for session setup/establishment. Thus, to send identity requests corresponding to four different entities/devices, the electronic device 102A only needs to send one array containing four different identity requests, instead of sending four separate identity requests. For example, the destination list of the allocation request may be an array that stores identifiers of each of the other electronic devices 102B-C, thereby allowing the electronic device 102A to transmit a single allocation request to initialize the session with multiple other electronic devices 102B-C.

Figure 15:
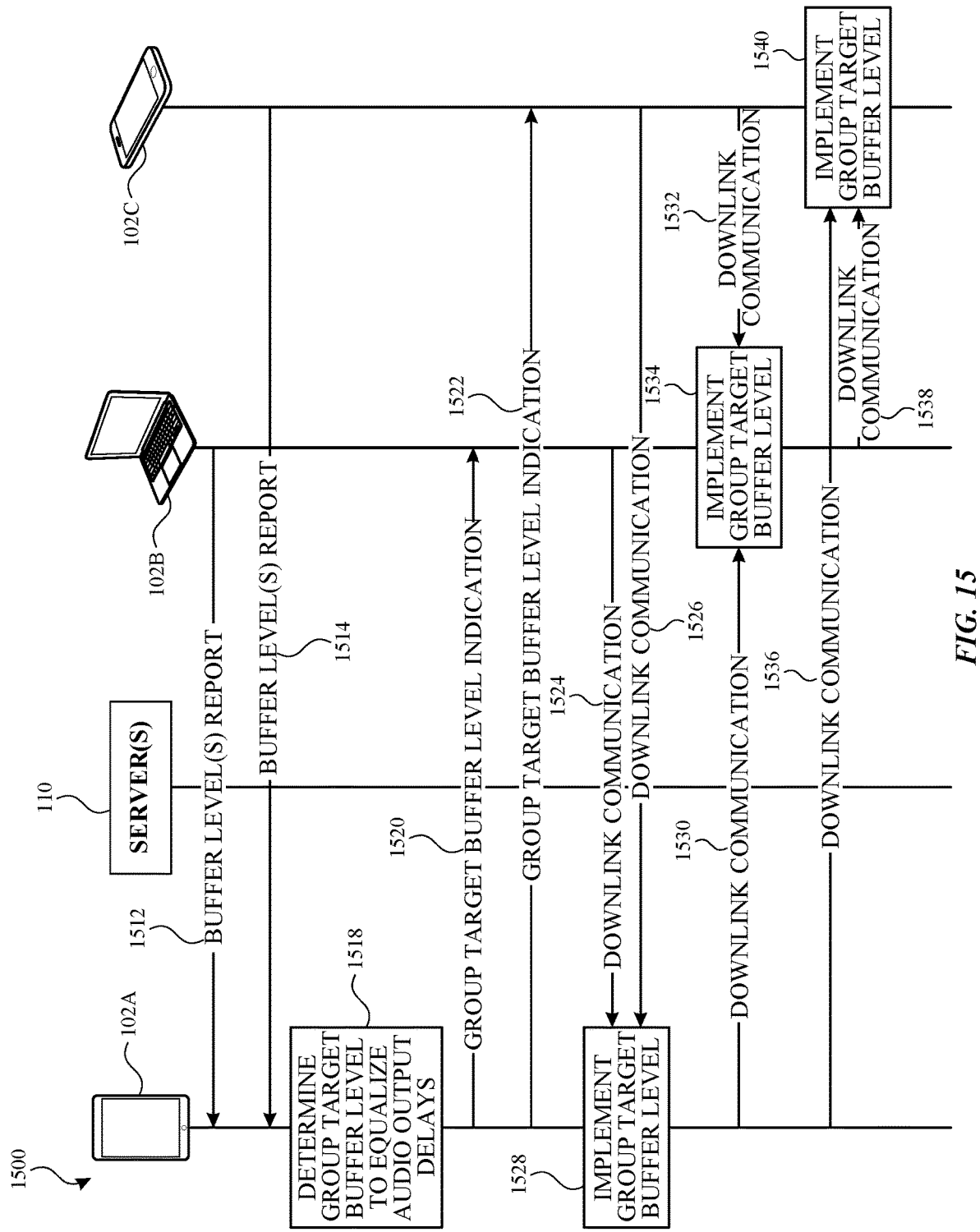
FIG. 15 illustrates a flow diagram of an example process of a multi-device communication management system in accordance with one or more implementations.

FIG. 15 illustrates a flow diagram of an example process 1500 of the multi-device communication management system in accordance with one or more implementations. For explanatory purposes, the process 1500 is primarily described herein with reference to the electronic devices 102A-C, and the server 110 of FIGS. 1-3. The electronic devices 102A-C and the server 110 are also presented as exemplary devices and the operations described herein may be performed by any suitable devices. The electronic devices 102A-C may communicate with one another directly and/or via a server (e.g., the server 110). Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more of the blocks of the process 1500 need not be performed and/or can be replaced by other operations.

In the process 1500, the electronic devices 102A-C may be participating in, or preparing to participate in, and audio/video group communication session. One or more of the electronic devices 102A-C and/or the server 110, such as the electronic device 102A, receives buffer level report(s) from the other electronic devices 102B-C in the group communication session (1512, 1514). A buffer level report may include, for example, information regarding one or more buffers, such as one or more jitter buffers at a given electronic device 102B. For example, the electronic device 102B may maintain a jitter buffer for audio and/or video packets received from the electronic device 102A, as well as a separate jitter buffer for audio and/or video packets received from the electronic device 102C. The jitter buffer may be used to avoid buffer underruns due to jitter and/or propagation delays. The information regarding the one or more buffers may include, for example, the current target buffer level being maintained, a range of the high and low buffer levels for a given period of time, and the like.

In one or more implementations, the current target buffer level being maintained by a given electronic device 102B for audio and/or video packets received from another electronic device 102A may be indicative of the audio and/or video output delay experienced by the user of the electronic device 102B with respect to the audio and/or video stream corresponding to the user of the electronic device 102A. For example, the higher the current target buffer level is, the greater the audio and/or video output delay may be, since a larger number of audio and/or video packets are being buffered. In one or more implementations, the electronic devices 102B-C may provide the buffer level reports to the electronic device 102A on a continuous and/or periodic basis.

The electronic device 102A may process the buffer level reports to determine a group target buffer level, and/or a group target buffer level range, to be implemented by each of the electronic devices 102A-C for each of the jitter buffers (1518). In this manner, the target buffer level, and corresponding audio and/or video output delay, will be substantially the same for each of the electronic devices 102A-C, thereby ensuring fairness in the communications of the audio/video group communication session, e.g., since each of the users will hear/see a given audio/video stream at approximately the same time and therefore have an equal opportunity to respond.

The electronic device 102A may determine the group target buffer level, for example, such that the group target buffer level is within, or above, the range of high and low buffer levels indicated by each of the electronic devices 102B-C, as well as the range of high and low buffer levels of the electronic device 102A. In one or more implementations, the electronic device 102A may determine the group target buffer level with an upper bound such that the audio and/or video delay experienced by the users of the electronic devices 102A-C is not excessively long.

The electronic device 102A may transmit an indication of the group target buffer level to the electronic device 102B (1520) and the electronic device 102C (1522). The electronic device 102A may subsequently receive one or more downlink communications from the electronic device 102B (1524), and one or more downlink communications from the electronic device 102C (1526), and the electronic device 102A may implement the group target buffer level (1528) for the received communications.

Similarly, the electronic device 102B may receive one or more downlink communications from the electronic device 102A (1530) and the electronic device 102C (1532), and the electronic device 102B may implement the group target buffer level (1534) for the received communications. The electronic device 102C may receive one or more downlink communications from the electronic device 102A (1536) and the electronic device 102B (1538), and the electronic device 102C may implement the group target buffer level (1540) for the received communications.

In one or more implementations, the server 110 may receive the buffer level reports from the electronic devices 102A-C, and the server 110 may determine the appropriate group target buffer level for the electronic devices 102A-C. In one or more implementations, the group target buffer level may be indicated as a percentage of the buffer that is occupied with data, a number of bytes in the buffer, etc.

In one or more implementations, the group target buffer level may be implemented as a function of the audio delay experienced at each of the electronic devices 102A-C. For example, the electronic devices 102A-C may share their audio delays with each other, and the electronic devices 102A-C may agree on an group audio delay. For example, the electronic devices 102A-C may agree to implement an audio delay that is equal to the greatest audio delay being experienced by one of the electronic devices 102A-C, such as the electronic device 102A. Thus, the electronic device 102A may not implement any additional audio delay, while the electronic devices 102B-C may implement an additional audio delay so that their total audio delay equals the audio delay experienced by the electronic device 102A.

Figure 16:
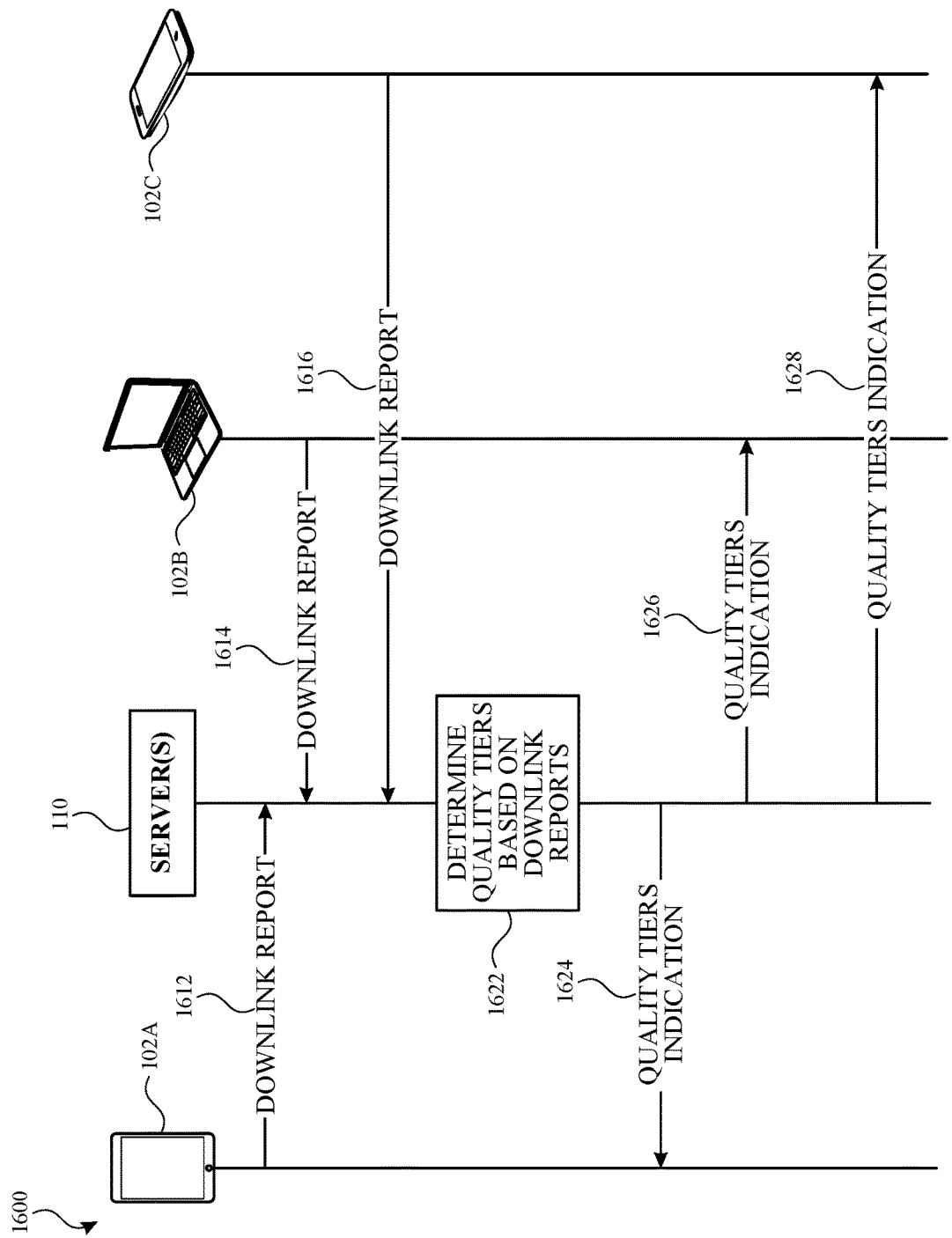
FIG. 16 illustrates a flow diagram of an example process of a multi-device communication management system in accordance with one or more implementations.

FIG. 16 illustrates a flow diagram of an example process 1600 of the multi-device communication management system in accordance with one or more implementations. For explanatory purposes, the process 1600 is primarily described herein with reference to the electronic devices 102A-C and the server 110 of FIGS. 1-3. However, the electronic devices 102A-C and the server 110 are presented as exemplary devices and the operations described herein may be performed by any suitable devices. The electronic devices 102A-C may communicate with one another directly and/or via a server (e.g., the server 110). Further for explanatory purposes, the blocks of the process 1600 are described herein as occurring in serial, or linearly. However, multiple blocks of the process 1600 may occur in parallel. In addition, the blocks of the process 1600 need not be performed in the order shown and/or one or more of the blocks of the process 1600 need not be performed and/or can be replaced by other operations.

In the process 1600, the electronic devices 102A-C may be participating in, or preparing to participate in, and audio/video group communication session, such as in coordination with the server 110. The server 110 may receive downlink condition reports from electronic devices 102A-C (1612, 1614, 1616) and determine a quality of the audio and/or video streams to be transmitted by each of the electronic devices 102A-C to each of the other electronic devices 102A-C for the audio/video group communication session (1622).

The downlink condition reports may indicate a downlink condition from the server 110 to the respective electronic devices 102A-C, such as downlink bandwidth, downlink signal to noise ratio (SNR), downlink bit error rate (BER), downlink received signal strength indication (RSSI), and the like. In one or more implementations, the downlink condition reports may be, and/or may include Real-time Transport Protocol (RTP) Control Protocol (RTCP) reports. The server 110 may also generate uplink condition reports for the uplink channels between the electronic devices 102A-C and the server 110. In one or more implementations, the uplink and downlink channels may be asymmetrical. For example, the electronic device 102A may have a downlink via Wi-Fi and have an uplink via cellular. Thus, the uplink and downlink channel conditions/bandwidths may differ for a given electronic device 102A.

Based on the downlink channel reports received by the server 110, and the uplink channel reports generated by the server 110, the server may determine appropriate tiers of audio and/or video streams to be transmitted and/or made available by each of the electronic devices 102A-C. For example, the server 110 may determine a number of tiers of quality levels of audio and/or video streams, such as three tiers, for each of the electronic devices 102A-C to provide and/or make available to the other electronic devices 102A-C.

The tiers for each of the electronic devices 102A-C may be determined by the server 110 such that high quality audio and/or video streams are made available to the electronic devices 102A-C that have the downlink bandwidth to support the high quality audio and/or video streams while also making low quality audio and/or video streams available to the electronic devices 102A-C that have downlink bandwidth constraints. In addition, the server 110 may account for the uplink channel conditions from a given electronic device 102A to the server 110 when determining the quality tiers for the given electronic device 102A. For example, the server 110 may determine the different quality tiers for the electronic device 102A such that the electronic device 102A has sufficient uplink bandwidth to support concurrently transmitting the streams at all three quality levels.

The server 110 may then transmit indications of the determined quality tiers to the electronic devices 102A-C, respectively (1624, 1626, 1628). The electronic devices 102A-C may then transcode and/or encode their audio and/or video streams to reflect each of the indicated quality tiers. For example, the electronic device 102A may encode a first video stream for a first tier at 1080P resolution, a second video stream for a second tier at 720P resolution, and a third video stream for a third tier at 480i resolution. Thus, the bit rates of the tiers may differ to account for the varying downlink conditions for each of the other electronic devices 102B-C. The electronic device 102A may then transmit all of the tiers of the audio and/or video streams to the server 110 and the server 110 may relay the appropriate streams to the other electronic devices 102B-C, such as based on the downlink channel conditions of each of the other electronic devices 102B-C. In one or more implementations, the server 110 may transmit an indication to the electronic device 102A indicating which of the audio and/or video streams will be forwarded to the other electronic devices 102B-C, and the electronic device 102A may only transmit the indicated audio and/or video streams to the server 110, and/or directly to the other electronic devices 102B-C.

In one or more implementations, the electronic devices 102A-C may exchange downlink and uplink channel reports to each other independent of the server 110. The electronic devices 102A-C may then each determine, e.g. independent of the server 110, the appropriate tiers of quality levels to make available to the other electronic devices 102A-C. In one or more implementations, the electronic devices 102A-C may advertise to the different quality tiers they have available to each other. For example, the electronic device 102A may broadcast, and/or publish to the server 110, a manifest file to the electronic devices 102B-C that lists the audio and/or video profiles of the audio and/or video streams that the electronic device 102A can provide. The profiles may include information such as bit rate, codec, resolution, frame rate, and the like. The other electronic devices 102B-C may receive the manifest and may transmit a message to the electronic device 102A requesting one of the available audio and/or video streams. The electronic device 102A may transmit the requested audio and/or video streams to the electronic devices 102B-C, such as directly or through the server 110.

In one or more implementations, the server 110 and/or the electronic devices 102A-C may continuously monitor the uplink and/or downlink channel reports and may dynamically and/or adaptively change the tiers of the quality levels being made available by one or more of the electronic devices 102A-C. Thus, as the network conditions change, or more electronic devices join the group communication session, the tiers of the quality levels are dynamically and/or adaptively adjusted.

In one or more implementations, the server 110 and/or the electronic devices 102A-D may cap the number of audio and/or video streams being received by a given electronic device 102A at any given time. For example, if the electronic device 102A has very little downlink bandwidth available, the server 110 may only transmit a single audio and/or video stream to the electronic device 102A, such as an audio and/or video stream corresponding to the user who is currently speaking or communicating. The electronic device 102A may display static images for the other users in the audio/video group communication session.

In one or more implementations, if the electronic device 102A only has sufficient bandwidth to receive an audio stream, e.g. without a video stream, the electronic device 102A may animate an images (or avatars) of the users associated with the other electronic devices 102B-C to coincide with when the users associated with the other electronic devices 102B-C are speaking. Thus, the mouths of the users in the images (and/or the mouths of the avatars) may open and close in synchronicity with the words being spoken by the other users.

In one or more implementations, the electronic device 102A may move from a first network (e.g., WLAN) that provides high uplink transmission rate to a second network (e.g., cellular network) that provides lower uplink transmission rate. In such an example, the electronic device 102A may be configured to transmit high quality audio and/or video streams via uplink communication while in the first network, and to transmit data of low quality audio and/or video streams via uplink communication while in the second network. In one example, even if the electronic device 102A is capable of transmitting a higher quality audio and/or video streams while in the second network, the electronic device 102A may be configured to transmit the low quality audio and/or video streams regardless of the uplink condition, in case the uplink condition deteriorates to a point where the higher quality audio and/or videos streams cannot be reliably transmitted in the uplink communication and/or in case downlink conditions/bandwidth to the other electronic devices 102B-C are not sufficient for communication of the higher quality audio and/or videos streams.

Figure 17:
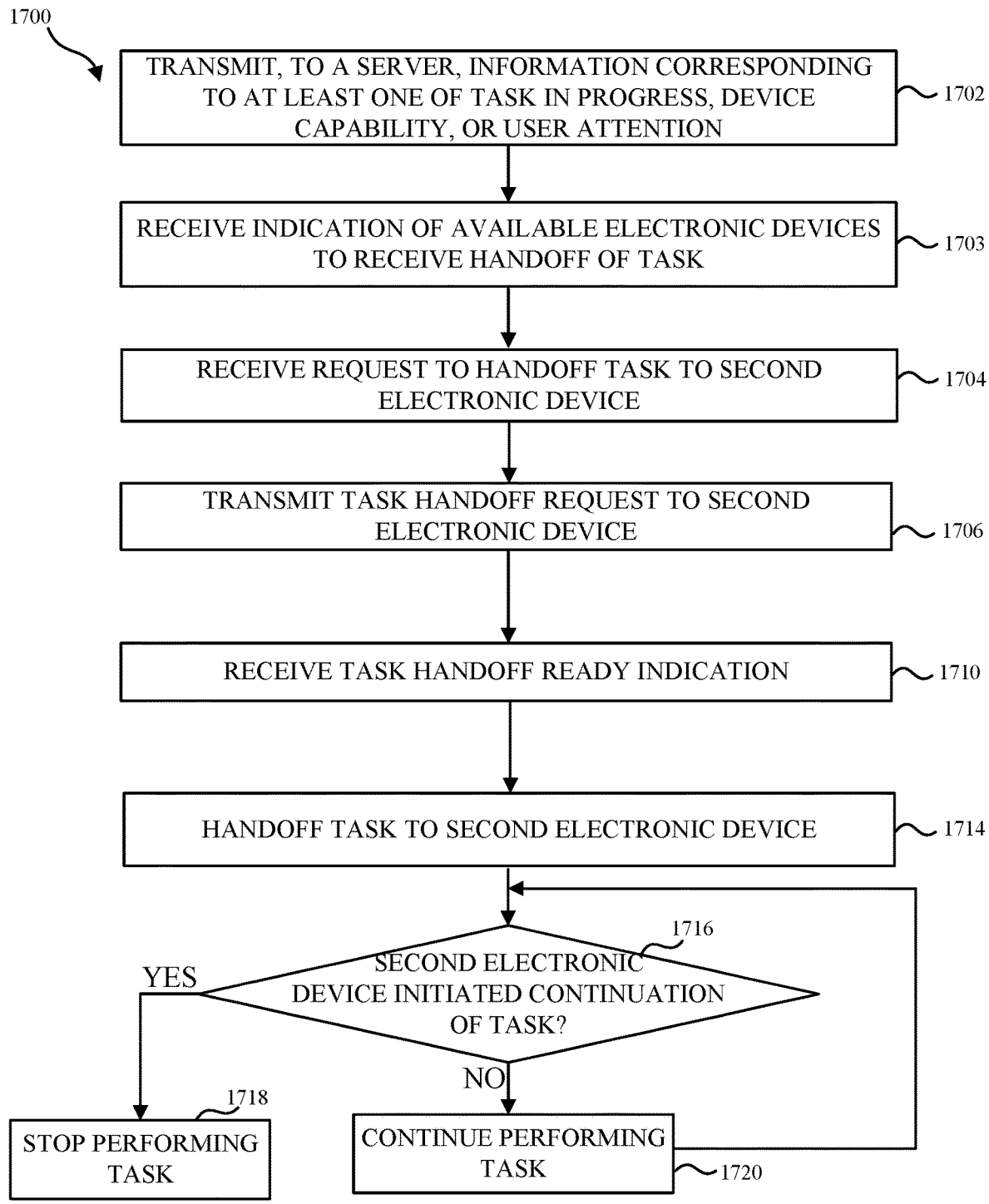
FIGS. 17 and 18 illustrate flow diagrams of example processes of a multi-device communication management system in accordance with one or more implementations.
Figure 18:
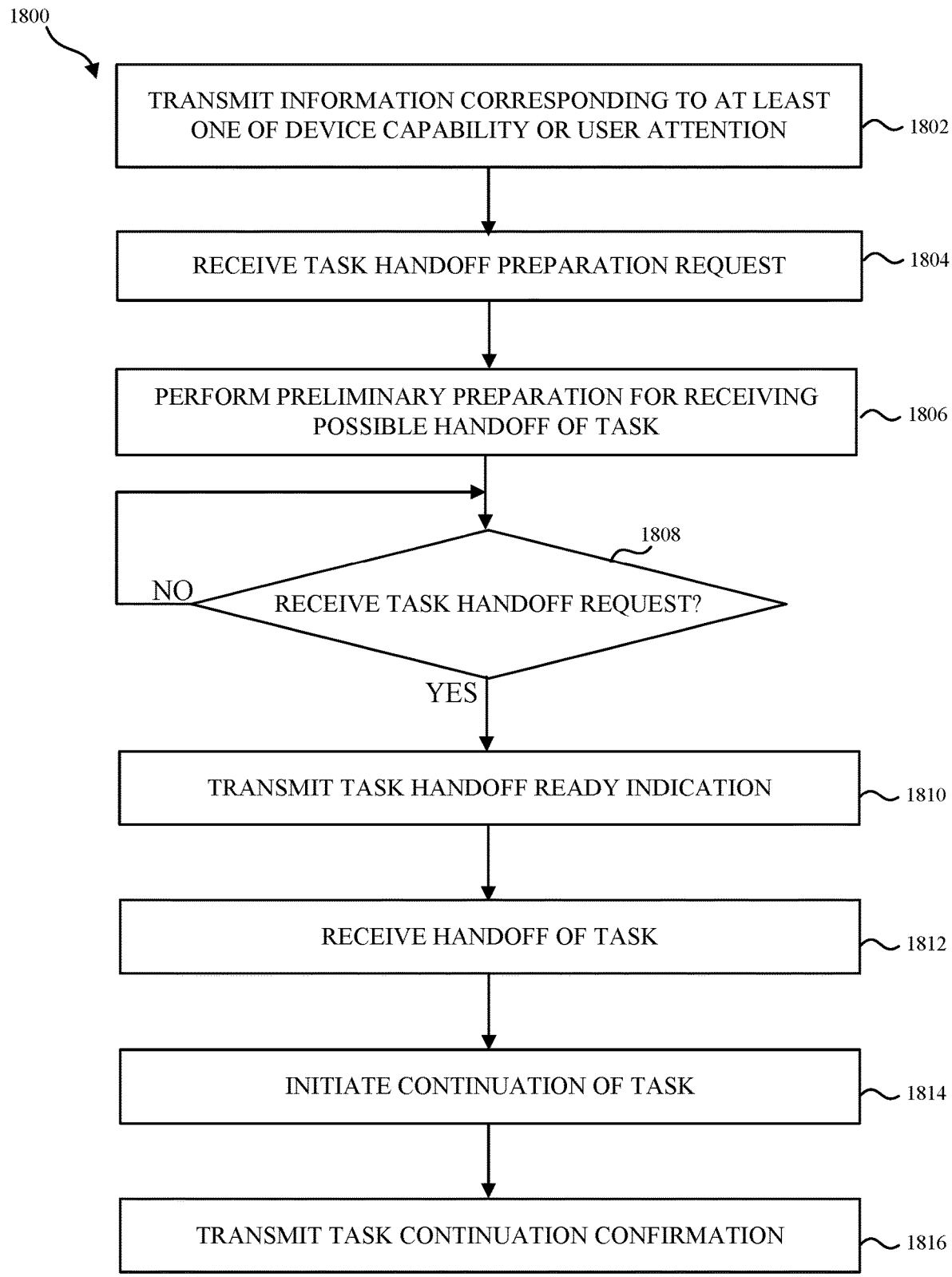

FIGS. 17 and 18 illustrate flow diagrams of example processes 1700 and 1800 of the multi-device communication management system in accordance with one or more implementations. For explanatory purposes, the processes 1700 and 1800 are primarily described herein with reference to the electronic device 102A of FIGS. 1-2. However, the processes 1700 and 1800 are not limited to the electronic device 102A, and one or more blocks (or operations) of the processes 1700 and 1800 may be performed by one or more other components of the electronic device 102A. The electronic device 102A also is presented as an exemplary device and the operations described herein may be performed by any suitable device, such as one or more of the other electronic devices 102B-D. Further for explanatory purposes, the blocks of the processes 1700 and 1800 are described herein as occurring in serial, or linearly. However, multiple blocks of the processes 1700 and 1800 may occur in parallel. In addition, the blocks of the processes 1700 and 1800 need not be performed in the order shown and/or one or more of the blocks of the processes 1700 and 1800 need not be performed and/or can be replaced by other operations.

The process 1700 describes a handoff of a task from the perspective of the electronic device 102A that is handing off the task. In the process 1700, the electronic device 102A transmits, to the server 110, information corresponding to at least one of a task in progress, device capability, or user attention (1702). For example, the electronic device 102A may transmit information regarding a task in progress, e.g. a task for which a handoff request may subsequently be received from the user, information regarding the capabilities of the electronic device 102A, and/or user attention information that is obtainable and/or determinable at the electronic device 102A.

The electronic device 102A may receive, from the server 110, an indication of the electronic devices that are registered to the same user account as the electronic device 102A and are available to receive a handoff of the task (1703). The electronic device 102A may provide the user with a list of the other electronic devices that are available to have a task handed off to.

The electronic device 102A may receive a request to handoff a task to a second electronic device, such as the electronic device 102D (1704). For example, the electronic device 102A may receive a request from the user to handoff the task to the electronic device 102D. Upon receiving the request to handoff the task (1704), the electronic device 102A transmits, to the second electronic device, such as the electronic device 102D, a task handoff request requesting that the second electronic device to prepare to receive a handoff of the task (1706).

Once the second electronic device is ready to receive the task, the electronic device 102A receives a task handoff ready indication from the second electronic device, such as the electronic device 102D (1710). When the second electronic device is prepared to receive the handoff of the task, the electronic device 102A initiates the handoff of the task to the second device (1714).

The electronic device 102A determines whether the second electronic device has initiated the continuation of the task (1716). In one or more implementations, the electronic device 102A determines whether the second electronic device has initiated the continuation of the task by determining whether a task continuation confirmation has been received from the second electronic device, the task continuation confirmation indicating that the second electronic device has initiated the continuation of the task. The electronic device 102A may be configured to determine that the second electronic device has initiated the continuation of the task when the task continuation confirmation is received. If the second electronic device has initiated the continuation of the task (1716), the electronic device 102A may stop performing the task (1718). If the second electronic device has not initiated the continuation of the task (1716), the electronic device 102A continues to perform the task (1720) at least until determining that the second electronic device has initiated the continuation of the task.

The process 1800 describes a handoff of a task from the perspective of the electronic device 102D that is receiving the handoff of the task. In the process 1800, the electronic device 102D may transmit, to the server 110 (and/or the electronic device 102A), information corresponding to at least one of a capability of the electronic device 102D or user attention information (1802). The electronic device 102D receives, from the server 110 (and/or the electronic device 102A), a task handoff preparation request (1804). The task handoff preparation request may be received by the electronic device 102D in anticipation of a task being handed off to the electronic device 102D but before a handoff of the task has been requested. In response receiving the task handoff preparation request, the electronic device 102D performs preliminary preparations for receiving a possible handoff of the task from the electronic device 102A (1806).

The electronic device 102D determines whether a task handoff request has been received, such as from the electronic device 102A and/or the server 110 (1808). When the task handoff request is received (1808), the electronic device completes any remaining preparations for receiving a handoff of the task. For example, the task handoff request may include information, such as task state information and/or application state information that was not available when the task handoff preparation request was received. Thus, in one or more implementations, the electronic device 102D may complete any remaining preparations for receiving the handoff of the task based at least in part on information received in the task handoff request.

When the electronic device 102D has completed the preparations to receive the handoff of the task, the electronic device 102D may transmit, to the electronic device 102A and/or the server 110, a task handoff ready indication indicating that the electronic device 102D is ready to receive the handoff of the task (1810). The electronic device 102D receives a handoff of the task from the electronic device 102A and/or the server 110 (1812). The handoff of the task may include task and/or application state information that may be used by the electronic device 102D to initiate the continuation of the task (1814). After initiating the continuation of the task, the electronic device 102D may transmit, to the server 110 and/or the electronic device 102A, a task continuation confirmation (1816).

FIGS. 19-23 illustrate flow diagrams of example processes 1900-2300 of the multi-device communication management system in accordance with one or more implementations. For explanatory purposes, the processes 1900-2300 are primarily described herein with reference to the electronic device 102A of FIGS. 1-3. However, the processes 1900-2300 are not limited to the electronic device 102A, and one or more blocks (or operations) of the processes 1900-2300 may be performed by one or more other components of the electronic device 102A. The electronic device 102A also is presented as an exemplary device and the operations described herein may be performed by any suitable device, such as one or more of the other electronic devices 102B-D and/or the server 110. Further for explanatory purposes, the blocks of the processes 1900-2300 are described herein as occurring in serial, or linearly. However, multiple blocks of the processes 1900-2300 may occur in parallel. In addition, the blocks of the processes 1900-2300 need not be performed in the order shown and/or one or more of the blocks of the processes 1900-2300 need not be performed and/or can be replaced by other operations.

In the process 1900, the electronic device 102A transmits, to an allocator server 414, an allocation request requesting allocation of a session (1902). The allocation request may include a group ID of the electronic device 102A for the session, a stable ID of the electronic device 102A. The allocation request may further include a destination device list identifying the one or more second devices to receive an allocation response. The allocation request may further include a session ID of the session and a participant ID of the electronic device 102A.

The electronic device 102A receives, from the allocator server 414, an allocation response in response to the allocation request, the allocation response including credential information for the electronic device 102A to use to join the session (1904). The credential information may include at least one of a session key or an access token for the electronic device 102A.

The electronic device 102A transmits, to a relay server 412, an allocation bind request with the credential information to join the session using the credential information (1906). The allocation bind request may include a session ID of the session and the credential information. The electronic device 102A receives, from the relay server 412, an allocation bind success response in response to the allocation bind request, the allocation bind success response indicating that the electronic device 102A has joined the session (1908). The electronic device 102A transmits a join notification to one or more other electronic devices 102B-C via a notification server 416 to notify the one or more other electronic devices 102B-C that the electronic device 102A has joined the session (1910).

Figure 19:
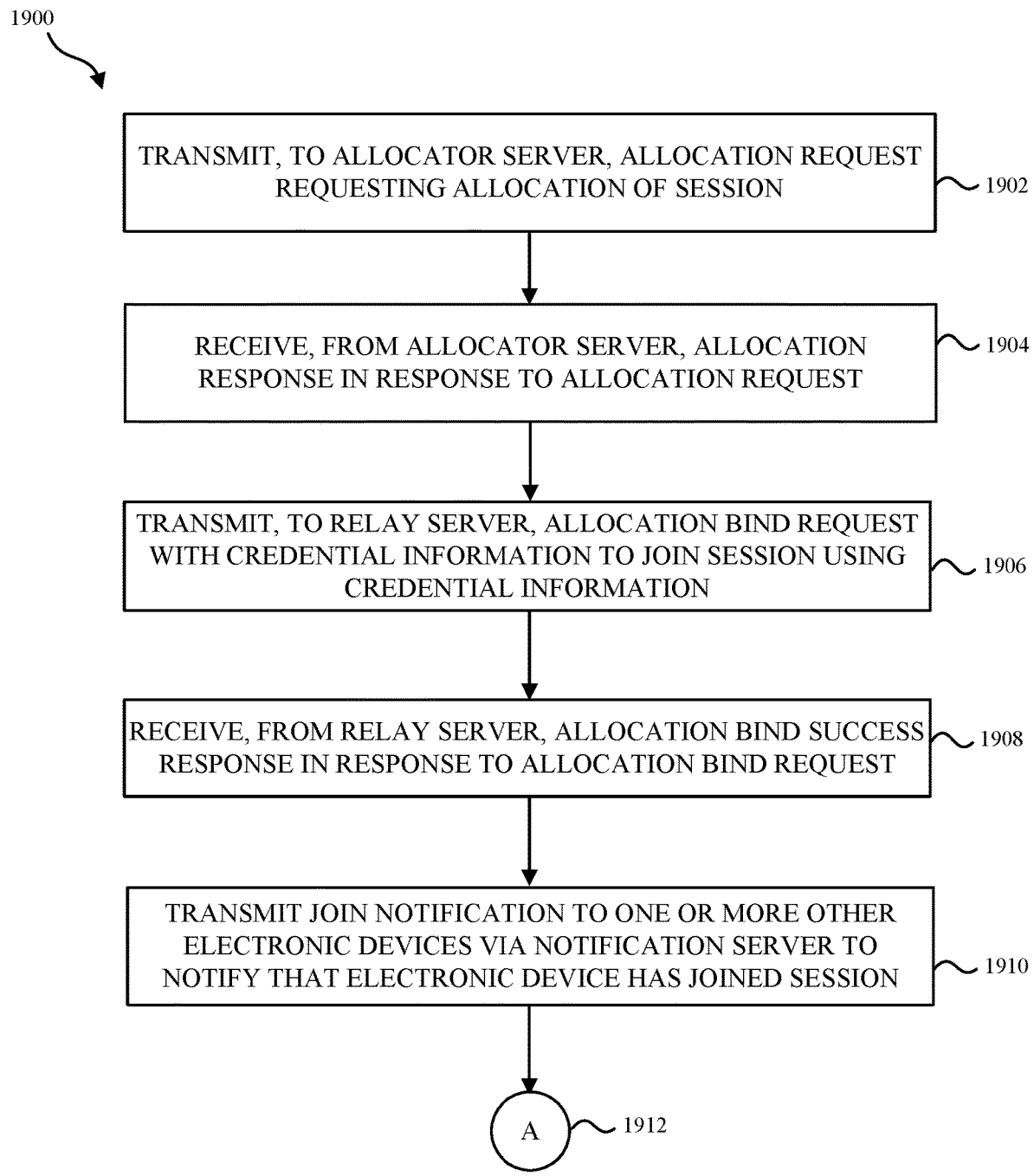
FIGS. 19-23 illustrate flow diagrams of example processes of a multi-device communication management system in accordance with one or more implementations.
Figure 20:
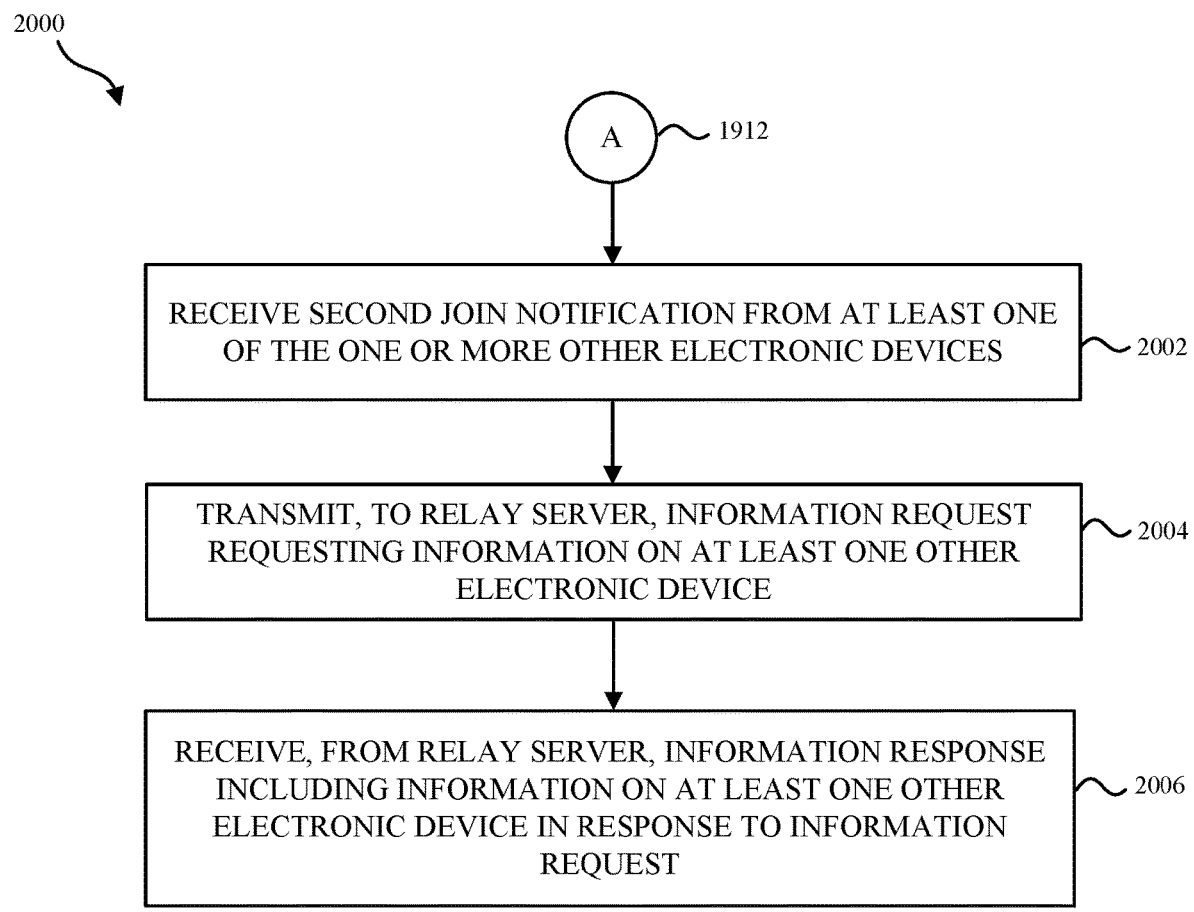

FIG. 20 illustrates a flow diagram of an example process 2000 of the multi-device communication management system in accordance with one or more implementations, continuing from FIG. 19. At 1912, the electronic device 102A continues from 1912 of FIG. 19. The electronic device 102A receives a second join notification from at least one of the other electronic devices 102B-C (2002), where the second join notification notifies the electronic device 102A that the at least one of the other electronic devices 102B-C has joined the session. The electronic device 102A transmits, to the relay server 412, an information request requesting information on the at least one of the other electronic devices 102B-C (2004). The electronic device 102A receives, from the relay server 412, an information response including the information on the at least one of the other electronic devices 102B-C in response to the information request (2006).

Figure 21:
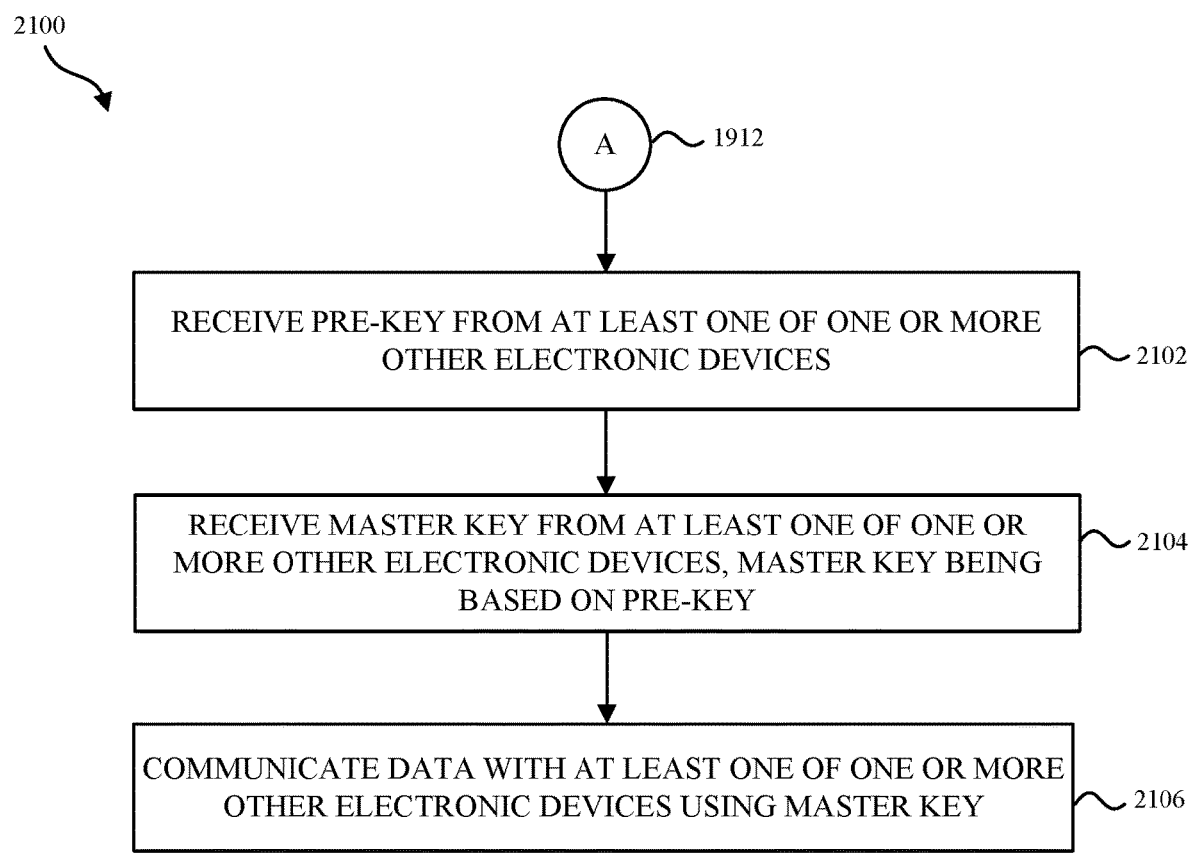

FIG. 21 illustrates a flow diagram of an example process 2100 of the multi-device communication management system in accordance with one or more implementations, continuing from FIG. 19. At 1912, the electronic device 102A continues from 1912 of FIG. 19. The electronic device 102A receives a pre-key from at least one of the one or more other electronic devices 102B-C (2102). The electronic device 102A receives a master key from the at least one of the one or more other electronic devices 102B-C, the master key being based on the pre-key (2104).

The electronic device 102A communicates data with the at least one of the one or more other electronic devices 102B-C using the master key, where the data is encrypted with the master key (2106). For example, the electronic device 102A may encrypt data with the master key and transmit the encrypted data to the at least one of the one or more other electronic devices 102B-C. For example, the electronic device 102A may receive encrypted data from the at least one of the one or more other electronic devices 102B-C, and decrypt the encrypted data using the master key.

Figure 22:
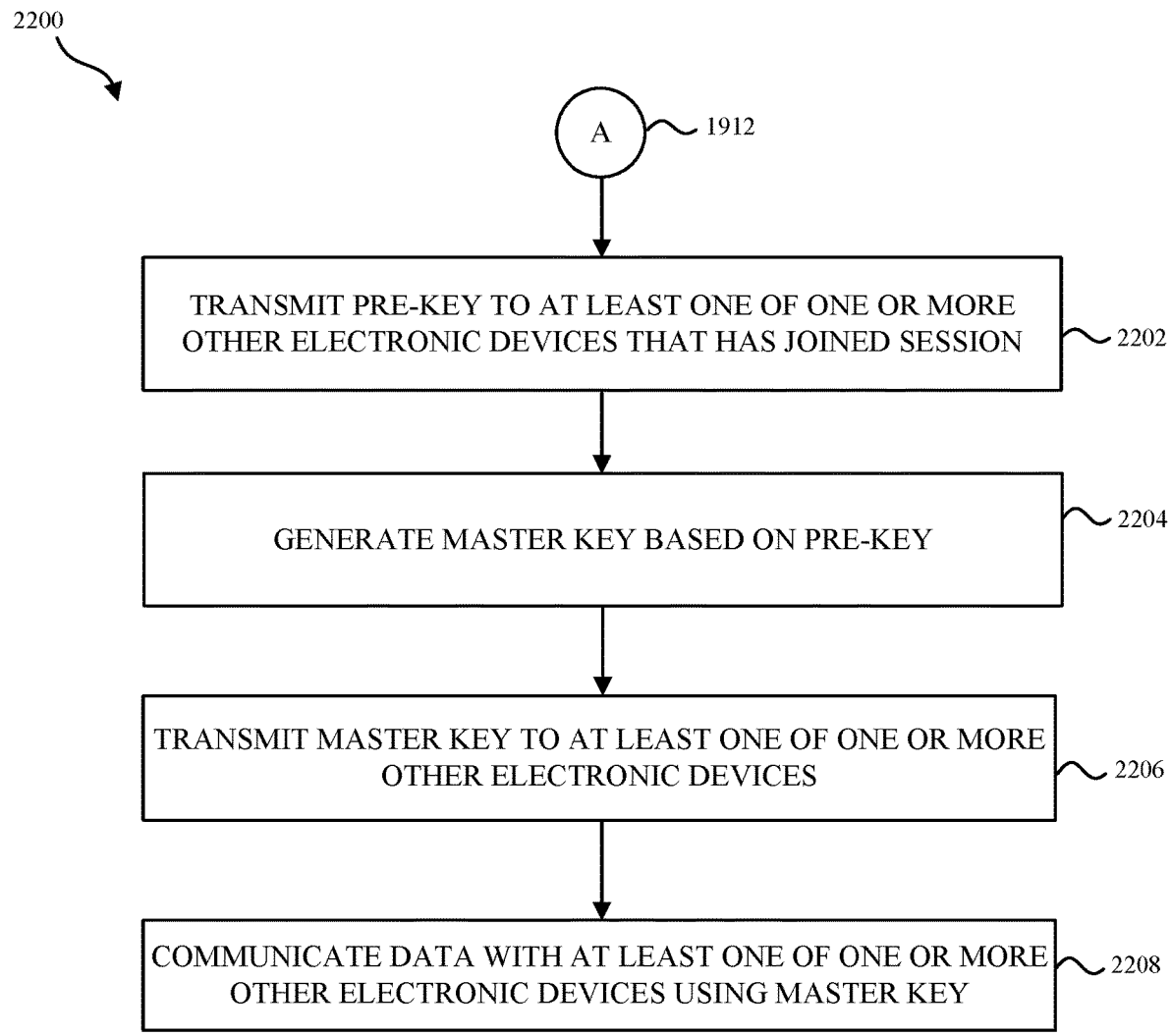

FIG. 22 illustrates a flow diagram of an example process 2200 of the multi-device communication management system in accordance with one or more implementations, continuing from FIG. 19. At 1912, the electronic device 102A continues from 1912 of FIG. 19. The electronic device 102A transmits a pre-key to at least one of the one or more other electronic devices 102B-C that has joined the session (2202). The electronic device 102A generates a master key based on the pre-key (2204). The electronic device 102A transmits the master key to the at least one of the one or more other electronic devices 102B-C (2206).

The electronic device 102A communicates data with the at least one of the one or more other electronic devices 102B-C using the master key, where the data is encrypted with the master key (2208). For example, the electronic device 102A may encrypt data with the master key and transmit the encrypted data to the at least one of the one or more other electronic devices 102B-C. For example, the electronic device 102A may receive encrypted data from the at least one of the one or more other electronic devices 102B-C, and may decrypt the encrypted data using the master key.

Figure 23:
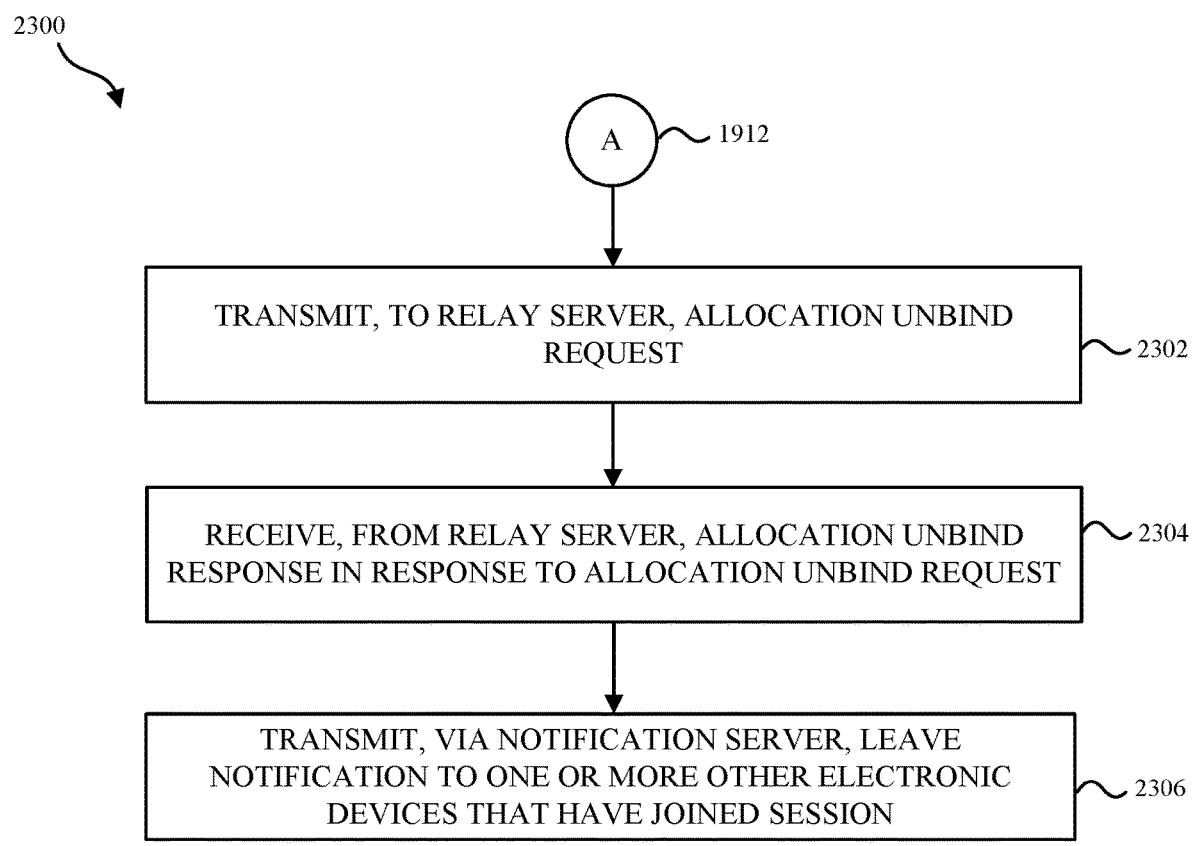

FIG. 23 illustrates a flow diagram of an example process 2300 of the multi-device communication management system in accordance with one or more implementations, continuing from FIG. 19. At 1912, the electronic device 102A continues from 1912 of FIG. 19. The electronic device 102A transmits, to the relay server 412, an allocation unbind request to leave the session (2302). The electronic device 102A receives, from the relay server 412, an allocation unbind response in response to the allocation unbind request to indicate that the electronic device 102A has left the session (2304). The electronic device 102A transmits a leave notification to the one or more other electronic devices 102B-C that have joined the session via the notification server 416 (2306). The leave notification notifies the one or more other electronic devices 102B-C that the electronic device 102A has left the session.

FIGS. 24-27 illustrate flow diagrams of example processes 2400-2700 of the multi-device communication management system in accordance with one or more implementations. For explanatory purposes, the processes 2400-2700 are primarily described herein with reference to the server 110 of FIGS. 1 and 3-4. However, the processes 2400-2700 are not limited to the server 110, and one or more blocks (or operations) of the processes 2400-2700 may be performed by one or more other components of the server 110. The server 110 also is presented as an exemplary device and the operations described herein may be performed by any suitable device. Further for explanatory purposes, the blocks of the processes 2400-2700 are described herein as occurring in serial, or linearly. However, multiple blocks of the processes 2400-2700 may occur in parallel. In addition, the blocks of the processes 2400-2700 need not be performed in the order shown and/or one or more of the blocks of the processes 2400-2700 need not be performed and/or can be replaced by other operations.

In the process 2400, the server 110 receives, from a first electronic device 102A, an allocation request requesting allocation of session (2402). The allocation request may include a group ID of the first electronic device 102A for the session, a stable ID of the first device. The allocation request may further include a destination device list identifying one or more second electronic devices 102B-C to receive an allocation response. The allocation response may further include a session ID of the session and a participant ID of the first electronic device 102A.

The server 110 transmits an allocation response to the first electronic device 102A and one or more second electronic devices 102B-C in response to the allocation request, the allocation response including credential information for the first electronic device 102A to use to join the session (2404). The credential information may include at least one of a session key or an access token for the first electronic device 102A.

The server 110 receives, from the first electronic device 102A, an allocation bind request with the credential information to join the session using the credential information (2406). The allocation bind request may include a session ID of the session and the credential information. The server 110 transmits, to the first electronic device 102A, an allocation bind success response in response to the allocation bind request, the allocation bind success response indicating that the first electronic device 102A has joined the session (2408).

Figure 24:
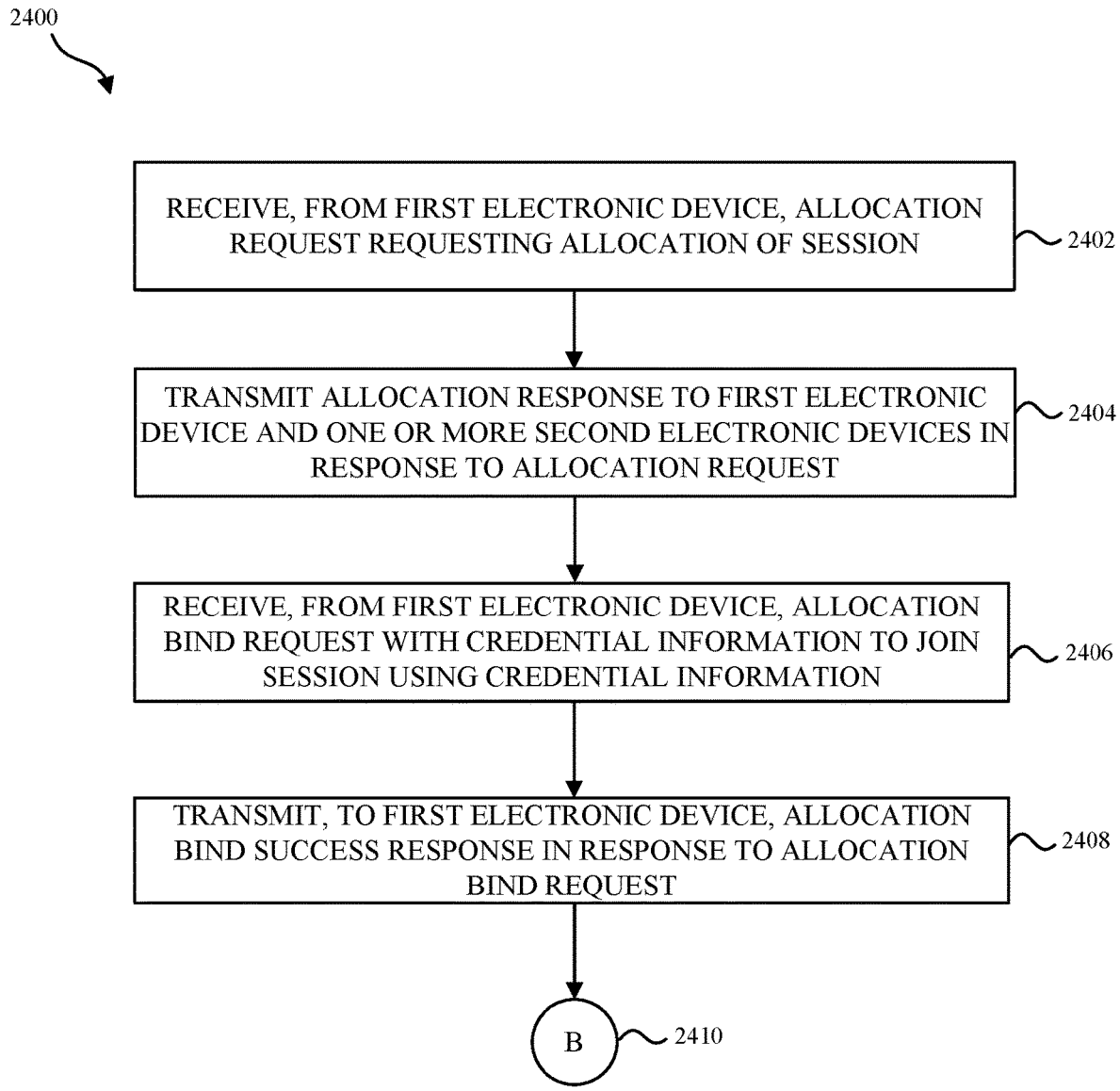
FIGS. 24-27 illustrate flow diagrams of example processes of a multi-device communication management system in accordance with one or more implementations.
Figure 25:
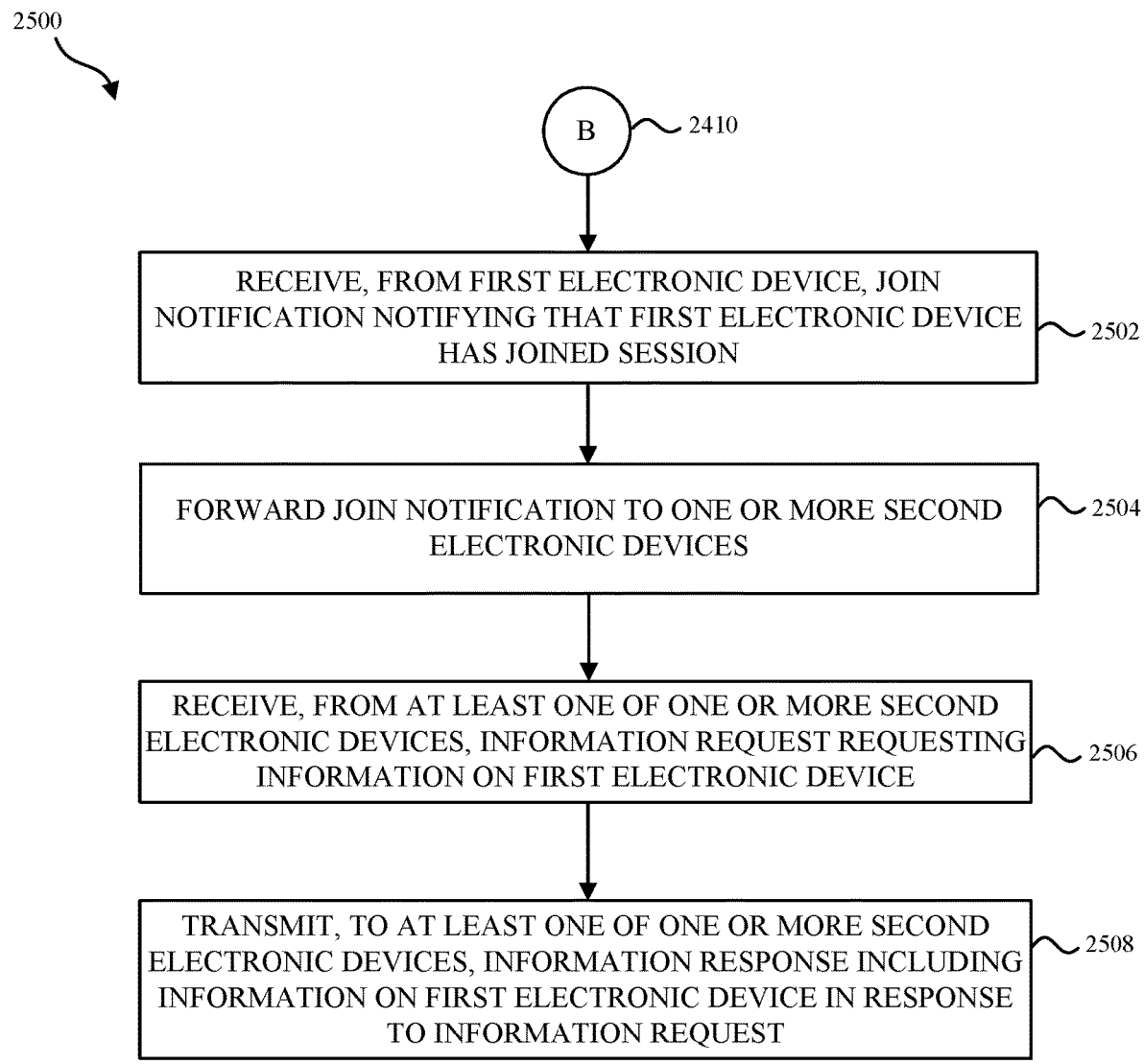

FIG. 25 illustrates a flow diagram of an example process 2500 of the multi-device communication management system in accordance with one or more implementations, continuing from FIG. 24. At 2410, the server 110 continues from 2410 of FIG. 24. The server 110 receives, from the first electronic device 102A, a join notification notifying that the first electronic device 102A has joined the session (2502). The server 110 forwards the join notification to the one or more second electronic devices 102B-C (2504). The server 110 receives, from at least one of the one or more second electronic devices 102B-Cs, an information request requesting information on the first electronic device 102A (2506). The server 110 transmits, to the at least one of the one or more second electronic devices 102B-C, an information response including the information on the first electronic device 102A in response to the information request (2508).

Figure 26:
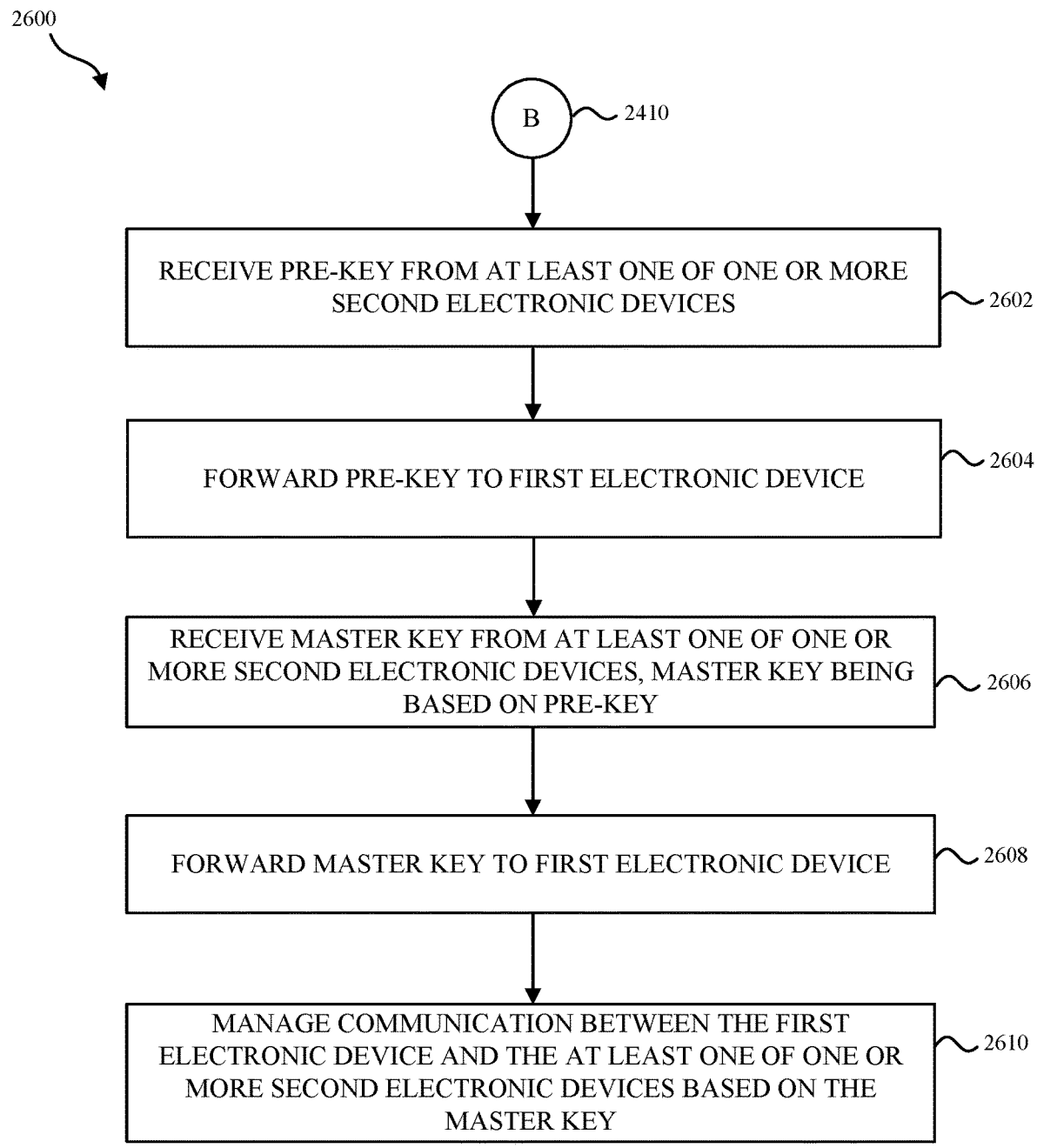

FIG. 26 illustrates a flow diagram of an example process 2600 of the multi-device communication management system in accordance with one or more implementations, continuing from FIG. 24. At 2410, the server 110 continues from 2410 of FIG. 24. The server 110 receives a pre-key from at least one of the one or more second electronic devices 102B-C (2602). The server 110 forwards the pre-key to the first electronic device 102A (2604). The server 110 receives a master key from the at least one of the second electronic devices 102B-C, the master key being based on the pre-key (2606). The server 110 forwards the master key to the first electronic device 102A (2608). The server 110 manage communication between the first electronic device 102A and the at least one of the one or more second electronic devices 102B-C based on the master key, where the communication is encrypted with the master key (2610).

Figure 27:
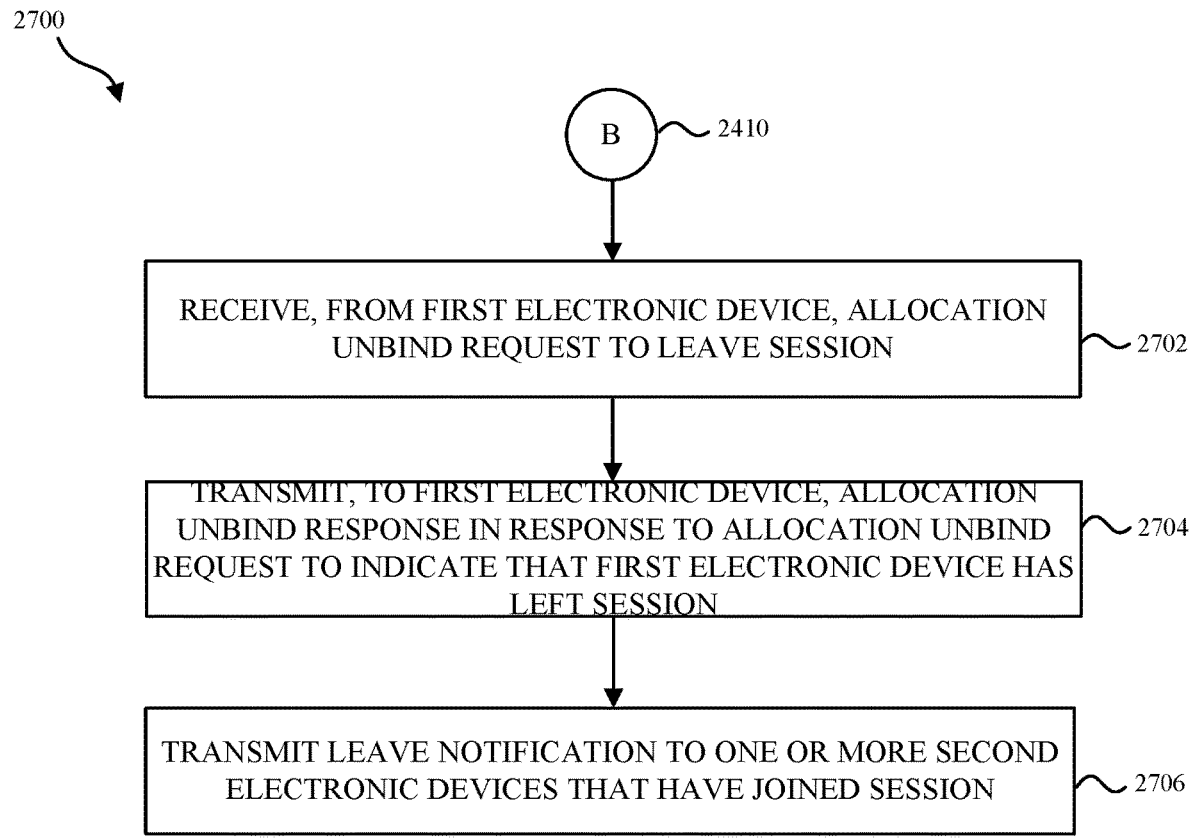

FIG. 27 illustrates a flow diagram of an example process 2700 of the multi-device communication management system in accordance with one or more implementations, continuing from FIG. 24. At 2410, the server 110 continues from 2410 of FIG. 24. The server 110 receives, from the first electronic device 102A, an allocation unbind request to leave the session (2702). The server 110 transmits, to the first electronic device 102A, an allocation unbind response in response to the allocation unbind request to indicate that the first electronic device 102A has left the session (2704). The server 110 transmits a leave notification to the one or more second electronic devices 102B-C that have joined the session, the leave notification notifying that the electronic device 102A has left the session (2706).

Figure 28:
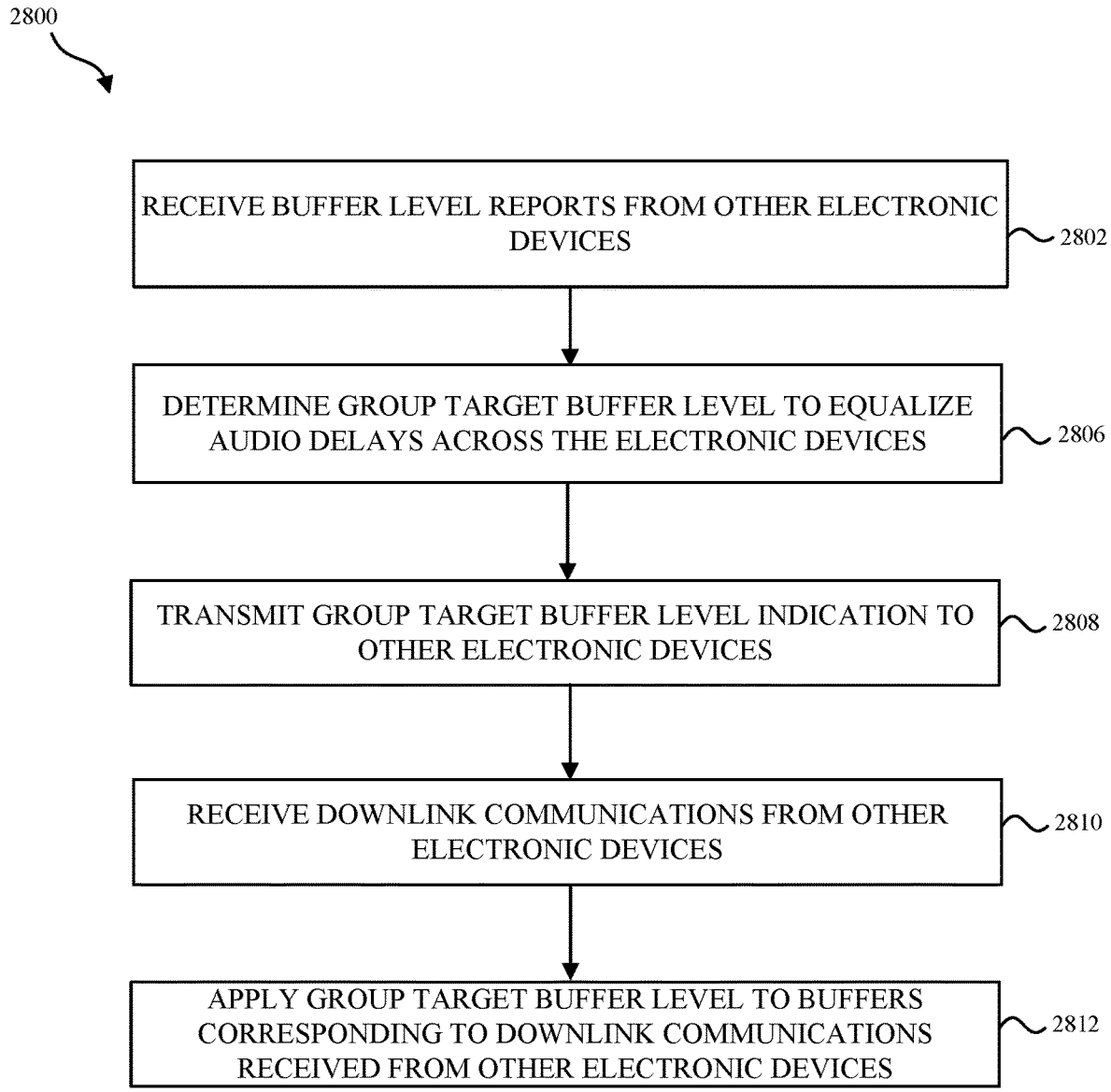
FIG. 28 illustrates a flow diagram of an example process of a multi-device communication management system in accordance with one or more implementations.

FIG. 28 illustrates a flow diagram of an example process 2800 of the multi-device communication management system in accordance with one or more implementations. For explanatory purposes, the process 2800 is primarily described herein with reference to the electronic device 102A of FIGS. 1-3. However, the process 2800 is not limited to the electronic device 102A, and one or more blocks (or operations) of the process 2800 may be performed by one or more other components of the electronic device 102A. The electronic device 102A also is presented as an exemplary device and the operations described herein may be performed by any suitable device, such as one or more of the other electronic devices 102B-D, and/or the server 110. Further for explanatory purposes, the blocks of the process 2800 are described herein as occurring in serial, or linearly. However, multiple blocks of the process 2800 may occur in parallel. In addition, the blocks of the process 2800 need not be performed in the order shown and/or one or more of the blocks of the process 2800 need not be performed and/or can be replaced by other operations.

The electronic device 102A receives buffer level reports from the other electronic devices 102B-C, respectively, that are participating in an audio and/or video group communication session (2802). In one or more implementations, the buffer level reports may indicate the current target buffer levels of each of the electronic devices 102A-C. The electronic device 102A determines a group target buffer level to equalize audio delays across the electronic devices 102A-C based at least in part on the received buffer level reports and the current target buffer level of the electronic device 102A (2806).

The electronic device 102A transmits an indication of the group target buffer level to each of the other electronic devices 102B-C (2808). The electronic device 102A receives downlink communications from the other electronic devices 102B-C (2810), and the electronic device 102A applies the group target buffer level to the buffers, such as jitter buffers, corresponding to the downlink communications received from the other electronic devices 102B-C (2812). In one or more implementations, the electronic device 102A may perform the process 2800 repeatedly, or continuously, throughout the audio and/or video group communication session.

Figure 29:
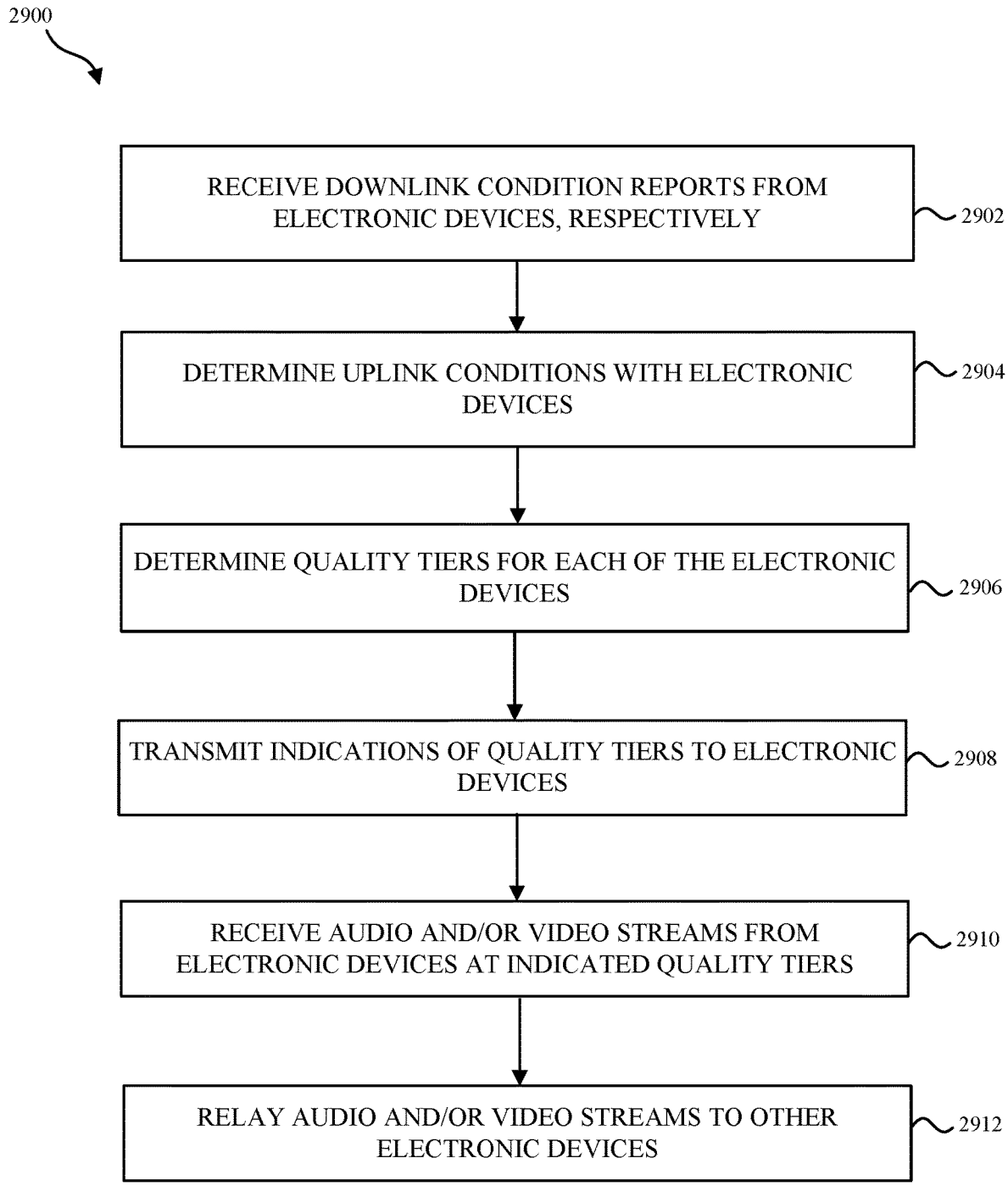
FIG. 29 illustrates a flow diagram of an example process of a multi-device communication management system in accordance with one or more implementations.

FIG. 29 illustrates a flow diagram of an example process 2900 of the multi-device communication management system in accordance with one or more implementations. For explanatory purposes, the process 2900 is primarily described herein with reference to the server 110 of FIGS. 1-3. However, the process 2900 is not limited to the server 110, and one or more blocks (or operations) of the process 2900 may be performed by one or more other components of the server 110. The server 110 also is presented as an exemplary device and the operations described herein may be performed by any suitable device, such as one or more of the electronic devices 102A-D. Further for explanatory purposes, the blocks of the process 2900 are described herein as occurring in serial, or linearly. However, multiple blocks of the process 2900 may occur in parallel. In addition, the blocks of the process 2900 need not be performed in the order shown and/or one or more of the blocks of the process 2900 need not be performed and/or can be replaced by other operations.

In the process 2900, the server 110 receives downlink condition reports from the electronic devices 102A-C, respectively, each downlink condition report indicating a downlink channel bandwidth and/or a downlink channel condition corresponding to the respective electronic device (2902). In one or more implementations, the electronic devices 102A-C may be participating in, or may be about to participate in, an audio and/or video group communication session. The server 110 may determine uplink conditions with respect to the electronic devices 102A-C (2904). For example, the server 110 may request that the electronic devices 102A-C transmit a measurement packet to the server 110 and/or otherwise participate in a protocol for determining uplink channel conditions.

The server 110 determines the appropriate quality tiers for the audio and/or video streams to be provided by each of the electronic devices 102A-C (2906). The server 110 transmits indications of the determined quality tiers to each of the respective electronic devices 102A-C (2908). In one or more implementations, the server 110 may transmit to one or more of the electronic devices 102A-C, such as the electronic device 102A, an indication of the quality tiers to be provided by the electronic device 102A, as well as indications of the quality tiers to be provided by the other electronic devices 102B-C. In this manner, the electronic device 102A is made aware of the quality tiers that are available from the other electronic devices 102B-C.

The server 110 receives the audio and/or video streams from the electronic devices 102A-C at the indicated quality tiers (2910), and the server 110 relays one of the quality tiers of an audio and/or video stream from each of the electronic devices 102A-C to each of the other electronic devices 102A-C (2912).

Figure 30:
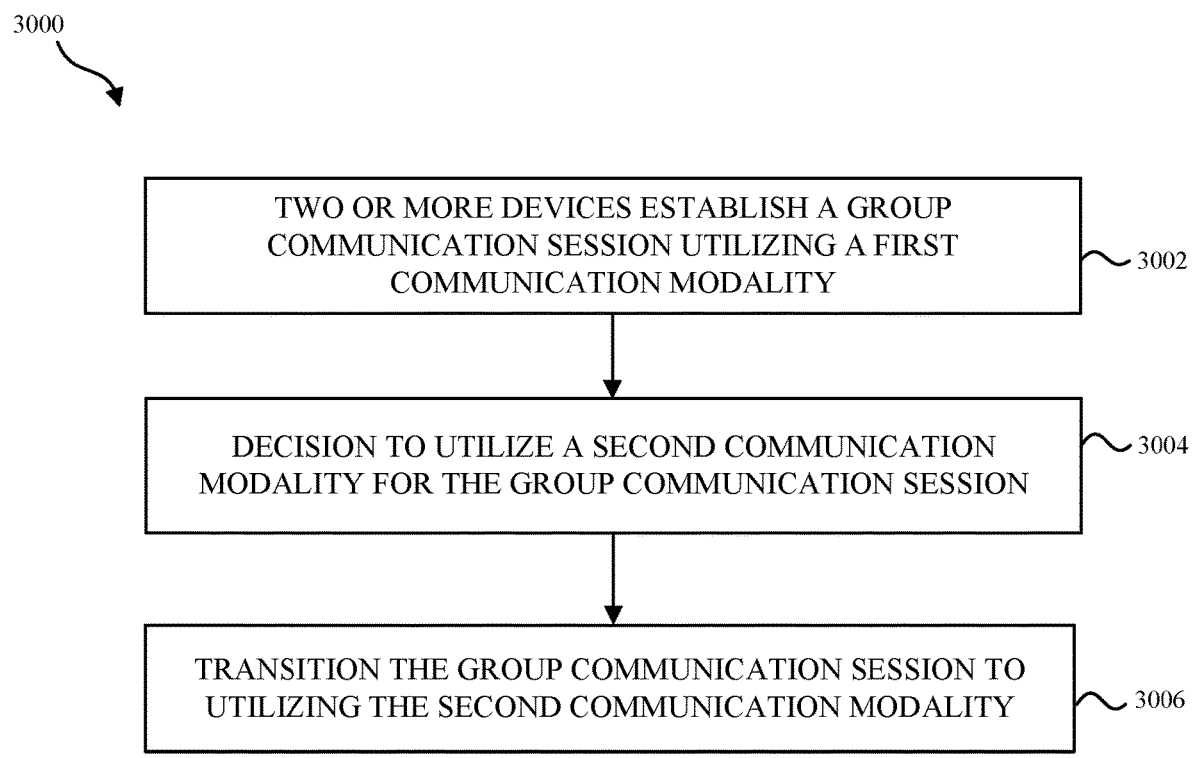
FIG. 30 illustrates a flow diagram of an example process of a multi-device communication management system in accordance with one or more implementations.

FIG. 30 illustrates a flow diagram of an example process 3000 of the multi-device communication management system in accordance with one or more implementations. For explanatory purposes, the process 3000 is primarily described herein with reference to the server 110 and the electronic devices 102A-B of FIG. 1. However, the process 3000 is not limited to the server 110 and/or the electronic devices 102A-B of FIG. 1, and one or more blocks (or operations) of the process 2900 may be performed by one or more other components of the server 110 and/or the electronic devices 102A-B. The server 110 and the electronic devices 102A-B also are presented as exemplary devices and the operations described herein may be performed by any suitable device, such as one or more of the other electronic devices 102C-D. Further for explanatory purposes, the blocks of the process 3000 are described herein as occurring in serial, or linearly. However, multiple blocks of the process 3000 may occur in parallel. In addition, the blocks of the process 3000 need not be performed in the order shown and/or one or more of the blocks of the process 3000 need not be performed and/or can be replaced by other operations.

Two or more of the electronic devices 102A-D, such as the electronic devices 102A-B, may establish a group communication session utilizing a first communication modality, such as one or more of messaging, audio (e.g. phone call), and/or video (e.g., an audio/video conference) (3002). In one or more implementations, the server 110 may facilitate the electronic devices 102A-B with establishing the group communication session, e.g., in the manner described above with respect to FIGS. 6-14, such as to establish a logical and/or physical infrastructure for the group communication session (establishing participant identifiers, security keys, and the like). The two or more electronic devices 102A-B may engage in the group communication session utilizing the first communication modality as well as utilizing at least one of: the participant identifiers or the security keys.

One or more of the electronic devices 102A-B, and/or the server 110, may decide that the group communication session should utilize a second communication modality, such as one or more of messaging, audio, and/or video that is not being utilized as the first communication modality (3004). For example, a user interacting with one or more of the electronic devices 102A-B may provide an indication, such as by a verbal command, interfacing with a user interface, etc., indicating that a messaging conversation should transition to an audio/video conference. In one or more implementations, one or more of the electronic devices 102A-B and/or the server 110 may determine based on one or more factors (e.g., available bandwidth, number of participants, etc.) that the group communication session should utilize the second communication modality, and the electronic devices 102A-B and/or the server may adaptively initiate the transition to utilizing the second communication modality, e.g., with or without confirmation from one or more of the users of the electronic devices 102A-B.

The electronic devices 102A-B, e.g., with or without facilitation from the server 110, may transition the group communication session to utilize the second communication modality, such as to an audio/video conference (3006). The group communication session may utilize the second communication modality in lieu of, or in addition to, the first communication modality. In one or more implementations, the group communication session may be transitioned to utilizing the second communication modality without having to re-establish the infrastructure for the group communication session. Thus, the electronic devices 102A-B may continue to use the participant identifiers, security keys, etc., established for the group communication session utilizing the first communication modality, e.g. messaging, while engaging in the group communication session utilizing the second communication modality, e.g., an audio/video conference.

Figure 31:
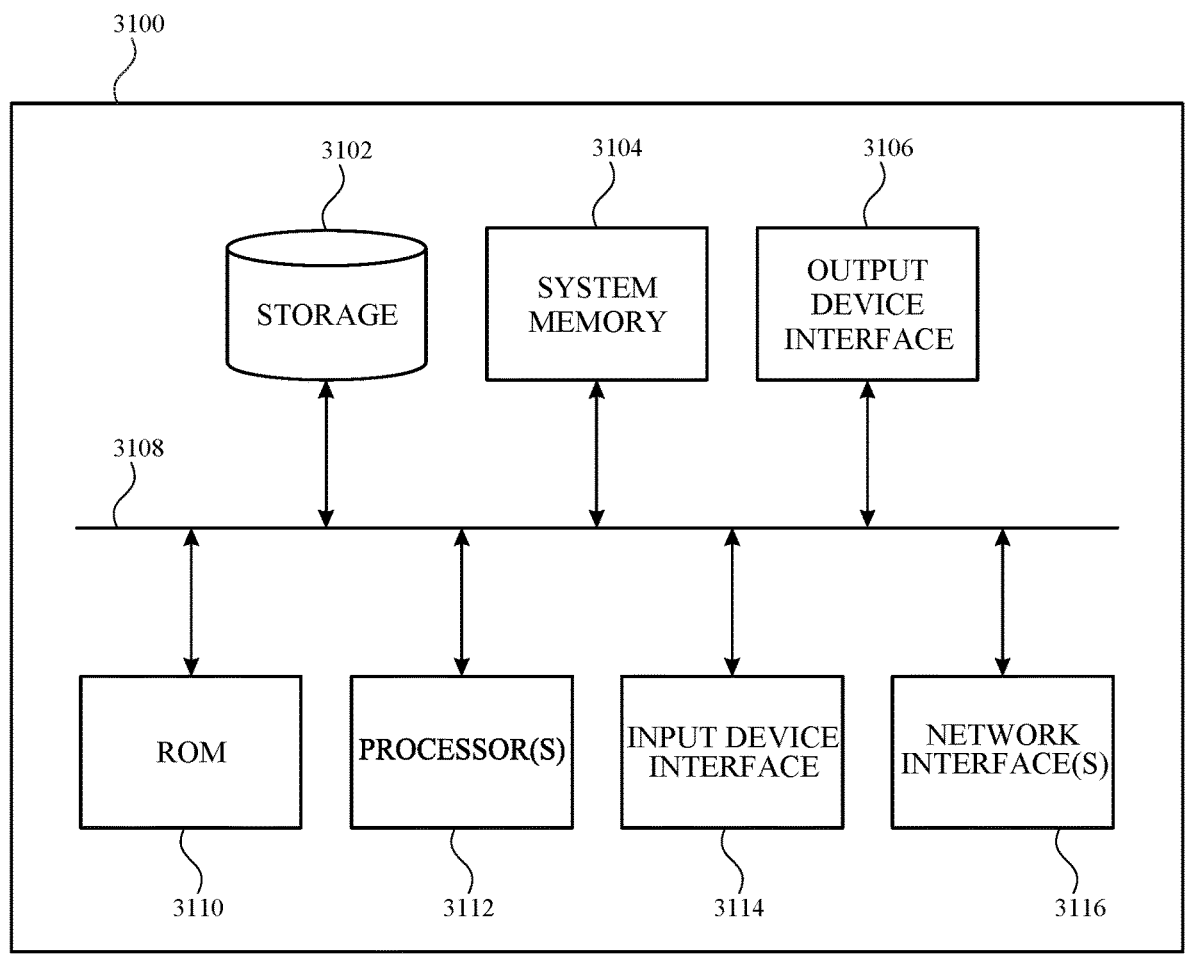
FIG. 31 illustrates an example electronic system with which aspects of the subject technology may be implemented in accordance with one or more implementations.

FIG. 31 illustrates an electronic system 3100 with which one or more implementations of the subject technology may be implemented. The electronic system 3100 can be, and/or can be a part of, one or more of the electronic devices 102A-D and/or the server 110 shown in FIG. 1. The electronic system 3100 may include various types of computer readable media and interfaces for various other types of computer readable media. The electronic system 3100 includes a bus 3108, one or more processing unit(s) 3112, a system memory 3104 (and/or buffer), a ROM 3110, a permanent storage device 3102, an input device interface 3114, an output device interface 3106, and one or more network interfaces 3116, or subsets and variations thereof.

The bus 3108 collectively represents all system, peripheral, and chipset buses that communicatively connect the numerous internal devices of the electronic system 3100. In one or more implementations, the bus 3108 communicatively connects the one or more processing unit(s) 3112 with the ROM 3110, the system memory 3104, and the permanent storage device 3102. From these various memory units, the one or more processing unit(s) 3112 retrieves instructions to execute and data to process in order to execute the processes of the subject disclosure. The one or more processing unit(s) 3112 can be a single processor or a multi-core processor in different implementations.

The ROM 3110 stores static data and instructions that are needed by the one or more processing unit(s) 3112 and other modules of the electronic system 3100. The permanent storage device 3102, on the other hand, may be a read-and-write memory device. The permanent storage device 3102 may be a non-volatile memory unit that stores instructions and data even when the electronic system 3100 is off. In one or more implementations, a mass-storage device (such as a magnetic or optical disk and its corresponding disk drive) may be used as the permanent storage device 3102.

In one or more implementations, a removable storage device (such as a floppy disk, flash drive, and its corresponding disk drive) may be used as the permanent storage device 3102. Like the permanent storage device 3102, the system memory 3104 may be a read-and-write memory device. However, unlike the permanent storage device 3102, the system memory 3104 may be a volatile read-and-write memory, such as random access memory. The system memory 3104 may store any of the instructions and data that one or more processing unit(s) 3112 may need at runtime. In one or more implementations, the processes of the subject disclosure are stored in the system memory 3104, the permanent storage device 3102, and/or the ROM 3110. From these various memory units, the one or more processing unit(s) 3112 retrieves instructions to execute and data to process in order to execute the processes of one or more implementations.

The bus 3108 also connects to the input and output device interfaces 3114 and 3106. The input device interface 3114 enables a user to communicate information and select commands to the electronic system 3100. Input devices that may be used with the input device interface 3114 may include, for example, alphanumeric keyboards and pointing devices (also called "cursor control devices"). The output device interface 3106 may enable, for example, the display of images generated by electronic system 3100. Output devices that may be used with the output device interface 3106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 31, the bus 3108 also couples the electronic system 3100 to one or more networks and/or to one or more network nodes, such as a cellular base station or a wireless access point. In this manner, the electronic system 3100 can be a part of a network of computers (such as a LAN, a wide area network ("WAN"), or an Intranet, or a network of networks, such as the Internet. Any or all components of the electronic system 3100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    at least one processor configured to cause the device to:
        transmit, to a server, device capability information corresponding to the device;
        receive, from the server, an indication of a task being performed at an other device;
        perform, in response to receipt of the indication and prior to initiation of a handoff of the task, one or more preliminary operations in anticipation of receiving the handoff of the task at the device;
        receive, after performing the one or more preliminary operations, a notification that the task is being handed off to the device;
        receive the handoff of the task from the other device; and
        continue to perform the task at the device based at least in part on the one or more preliminary operations that were performed prior to receiving the notification that the task is being handed off to the device.

2. The device of claim 1, wherein the device and the other device are registered to a same user account.

3. The device of claim 1, wherein the at least one processor is further configured to:
    receive task state information along with the handoff of the task; and
    continue the task at the device based at least in part on the one or more preliminary operations as well as the task state information.

4. The device of claim 3, wherein the task state information comprises digital assistant state information.

5. The device of claim 1, wherein the at least one processor is further configured to:
    transmit, to the server and with the device capability information, user attention information that indicates that an attention of a user associated with the task is on the device.

6. The device of claim 5, wherein the at least one processor is further configured to:
    receive, from the server, the indication of the task being performed responsive to transmitting, to the server, the device capability information and the user attention information.

7. The device of claim 1, wherein the at least one processor is further configured to:
    transmit, responsive to continuing the task at the device, a task handoff confirmation to the other device, wherein the other device stops performing the task responsive to receiving the task handoff confirmation.

8. The device of claim 1, wherein the one or more preliminary operations comprise at least one of: obtaining a security key associated with the task or registering with a server associated with the task.

9. A non-transitory machine-readable medium storing code that, when executed by a processor, causes the processor to perform operations, the code comprising:
    code to perform, by a user device, one or more preliminary operations in anticipation of receiving a handoff of a task being performed at an other user device and prior to the handoff of the task being requested;
    code to receive, after performing the one or more preliminary operations, a notification that the task is being handed off to the user device;
    code to receive, by the user device, the handoff of the task from the other user device; and code to continue to perform, by the user device, the task based at least in part on the one or more preliminary operations that were previously performed.

10. The non-transitory machine-readable medium of claim 9, wherein the user device and the other user device are registered to a same user account.

11. The non-transitory machine-readable medium of claim 9, wherein the code further comprises:
code to receive task state information along with the handoff of the task; and
code to continue to perform, by the user device, the task based at least in part on the one or more preliminary operations as well as the task state information.

12. The non-transitory machine-readable medium of claim 11, wherein the task state information comprises digital assistant state information.

13. The non-transitory machine-readable medium of claim 9, wherein the code further comprises code to receive an indication of the task being performed at the other user device prior to performing the one or more preliminary operations.

14. The non-transitory machine-readable medium of claim 13, further comprising:
code to receive, from a server, the indication of the task being performed responsive to transmitting, to the server, user attention information that indicates an attention of a user.

15. A method, comprising:
transmitting, to a server, user attention information that indicates that an attention of a user is on a device;
receiving, from the server, an indication of a task being performed at an other device responsive to the transmitted user attention information;
performing, in response to receipt of the indication and prior to a user request for a handoff of the task, one or more preliminary operations in anticipation of receiving the handoff of the task at the device;
receiving, after performing the one or more preliminary operations, a notification that the task is being handed off to the device;
receiving the handoff of the task from the other device; and
continuing to perform the task at the device based at least in part on the one or more preliminary operations.

16. The method of claim 15, wherein the device and the other device are registered to a same user account.

17. The method of claim 15, further comprising:
receiving task state information along with the handoff of the task,
wherein the task is continued to be performed at the device further based on the task state information.

18. The method of claim 17, wherein the task state information comprises digital assistant state information.

19. The method of claim 15, further comprising:
transmitting, responsive to continuing the task at the device, a task handoff confirmation to the other device, wherein the other device stops performing the task responsive to receiving the task handoff confirmation.

20. The method of claim 15, wherein the one or more preliminary operations comprise at least one of: obtaining a security key associated with the task or registering with a server associated with the task.

* * * * *